(12) United States Patent
Sasaki et al.

(10) Patent No.: US 9,796,409 B2
(45) Date of Patent: Oct. 24, 2017

(54) POWER STEERING DEVICE AND CONTROL DEVICE FOR VEHICLE-MOUNTED INSTRUMENT

(71) Applicant: HITACHI AUTOMOTIVE SYSTEMS STEERING, LTD., Hiki-gun, Saitama (JP)

(72) Inventors: Mitsuo Sasaki, Hadano (JP); Takumi Hisazumi, Atsugi (JP)

(73) Assignee: HITACHI AUTOMOTIVE SYSTEMS STEERING, LTD., Saitama (JP)

( * ) Notice: Subject to any disclaimer, the term of this patent is extended or adjusted under 35 U.S.C. 154(b) by 0 days.

(21) Appl. No.: 14/912,172

(22) PCT Filed: Jul. 30, 2014

(86) PCT No.: PCT/JP2014/070022
§ 371 (c)(1),
(2) Date: Feb. 16, 2016

(87) PCT Pub. No.: WO2015/040960
PCT Pub. Date: Mar. 26, 2015

(65) Prior Publication Data
US 2016/0200353 A1    Jul. 14, 2016

(30) Foreign Application Priority Data

Sep. 20, 2013  (JP) ................. 2013-195888

(51) Int. Cl.
*B62D 5/04*  (2006.01)
*B62D 6/00*  (2006.01)

(52) U.S. Cl.
CPC ............. *B62D 5/0463* (2013.01); *B62D 5/04* (2013.01); *B62D 5/049* (2013.01); *B62D 6/00* (2013.01)

(58) Field of Classification Search
CPC ........ B62D 5/04; B62D 5/0463; B62D 5/049; B62D 6/00
(Continued)

(56) References Cited

U.S. PATENT DOCUMENTS 4,972,320 A * 11/1990 Sugiura .................. B62D 5/049
                                                                      180/446
6,240,349 B1 * 5/2001 Nishimoto ............. B62D 5/049
                                                                      180/443
(Continued)

FOREIGN PATENT DOCUMENTS

JP     2000-137917 A    5/2000
JP     2000-305603 A    11/2000
(Continued)

*Primary Examiner* — Tyler J Lee
(74) *Attorney, Agent, or Firm* — Foley & Lardner LLP

(57) ABSTRACT

In a power steering device and a vehicle-mounted instrument, an abnormality detection accuracy of a state quantity detection means is increased.

In an electric power steering device and a vehicle-mounted instrument that are each provided with a plurality of state quantity detection means, an abnormality detection for the state quantity detection means is carried out by comparing detection signals issued from the state quantity detection means provided on a redundant system, and by comparing the detection signals issued from the state quantity detection means with signals that are issued from other state quantity detecting means and calculated to be matched with the same unit as the compared detection signals, a value or close value that is possessed by the largest number of signals is set as a normal value.

16 Claims, 19 Drawing Sheets

(58) Field of Classification Search
USPC ..................................................... 701/41–43
See application file for complete search history.

(56) References Cited

U.S. PATENT DOCUMENTS

| | | | | |
|---|---|---|---|---|
| 7,444,217 | B2* | 10/2008 | Matsuoka | B62D 5/049 |
| | | | | 701/31.1 |
| 2002/0120378 | A1* | 8/2002 | Kawada | B62D 5/049 |
| | | | | 701/41 |
| 2006/0184298 | A1 | 8/2006 | Matsuoka | |
| 2013/0245794 | A1 | 9/2013 | Ishii et al. | |
| 2013/0289826 | A1* | 10/2013 | Yoshitake | B62D 5/049 |
| | | | | 701/42 |
| 2013/0289827 | A1* | 10/2013 | Yoshitake | B62D 5/0463 |
| | | | | 701/42 |
| 2014/0360803 | A1* | 12/2014 | Hori | B62D 5/0484 |
| | | | | 180/446 |

FOREIGN PATENT DOCUMENTS

| | | |
|---|---|---|
| JP | 2006-143151 A | 6/2006 |
| JP | 2006-188157 A | 7/2006 |
| JP | 2009-012511 A | 1/2009 |
| JP | 2009-073446 A | 4/2009 |
| JP | 2010-149678 A | 7/2010 |
| JP | 2012-159956 A | 8/2012 |

* cited by examiner

POWER STEERING DEVICE AND CONTROL DEVICE FOR VEHICLE-MOUNTED INSTRUMENT

TECHNICAL FIELD

The present invention relates to a power steering device and a control device for a vehicle-mounted instrument.

BACKGROUND ART

In recent years, further development of commercial value of products has been required with the spread of EPS. In such development, there is a requirement for keeping an assist function in case of a failure even though the assist function has a time limit for operation. For keeping the assist function of EPS, a method is known wherein a plurality of state quantity detecting means (which are for example a steering torque sensor, a steering angle sensor, a motor rotation angle sensor, etc.) are provided and abnormal one of the condition detecting means is found by comparing detection signals issued from the state quantity detecting means.

PRIOR ART DOCUMENTS

Patent Documents

Patent Document 1: Japanese Laid-open Patent Application (tokkai) 2006-143151

SUMMARY OF INVENTION

In the above-mentioned method, it is necessary to make a conversion and/or estimation to the detection signals at the time of comparing the detection signals issued from the state quantity detecting means, which however lowers an abnormality detection accuracy. As a result, it sometimes happens that an abnormal condition to be detected can't be detected and a normal detection signal is misjudged as an abnormal signal. For example, in case where a vehicle runs on a road surface whose friction coefficient μ is quite low, misjudgment tends to occur because the steering angle is varied even though the steering torque is small.

As will be understood from the above description, in the field of the power steering device and the control device for the vehicle-mounted instrument, it is necessary to improve the abnormality detection accuracy of the state quantity detecting means.

The present invention is characterized by having a first abnormality detection circuit that detects an abnormality of one of a steering torque sensor, a steering angle sensor and a motor rotation angle sensor by comparing a pair of steering torque detection signals, a pair of steering angle detection signals and a pair of motor rotation angle detection signals; a comparison signal production circuit that produces or selects a comparison signal by using a signal other than the already compared signals, the comparison signal having the same unit of measure as the already compared comparison signals; a second abnormality detection circuit that compares the signal produced by the comparison signal production circuit with the already compared signal thereby to make a value of close value that is possessed by the largest number of the signals as a normal value and other values as abnormal value; and a control continuation judgment circuit that continues a steering assist control by using the normal value when the normal value is calculated before the abnormality is determined, and stops or limits the steering assist control when the abnormality is determined before the normal value is calculated.

In accordance with the present invention, in a power steering device and a control device for a vehicle-mounted instrument, an abnormality detection accuracy of the state quantity detecting means can be improved.

EMBODIMENTS FOR CARRYING OUT INVENTION

In following, first to fifth embodiments of the present invention, which are power steering devices and control devices for a vehicle-mounted instrument, will be described in detail with reference to FIGS. 1 to 19.

First Embodiment

Figure 1:
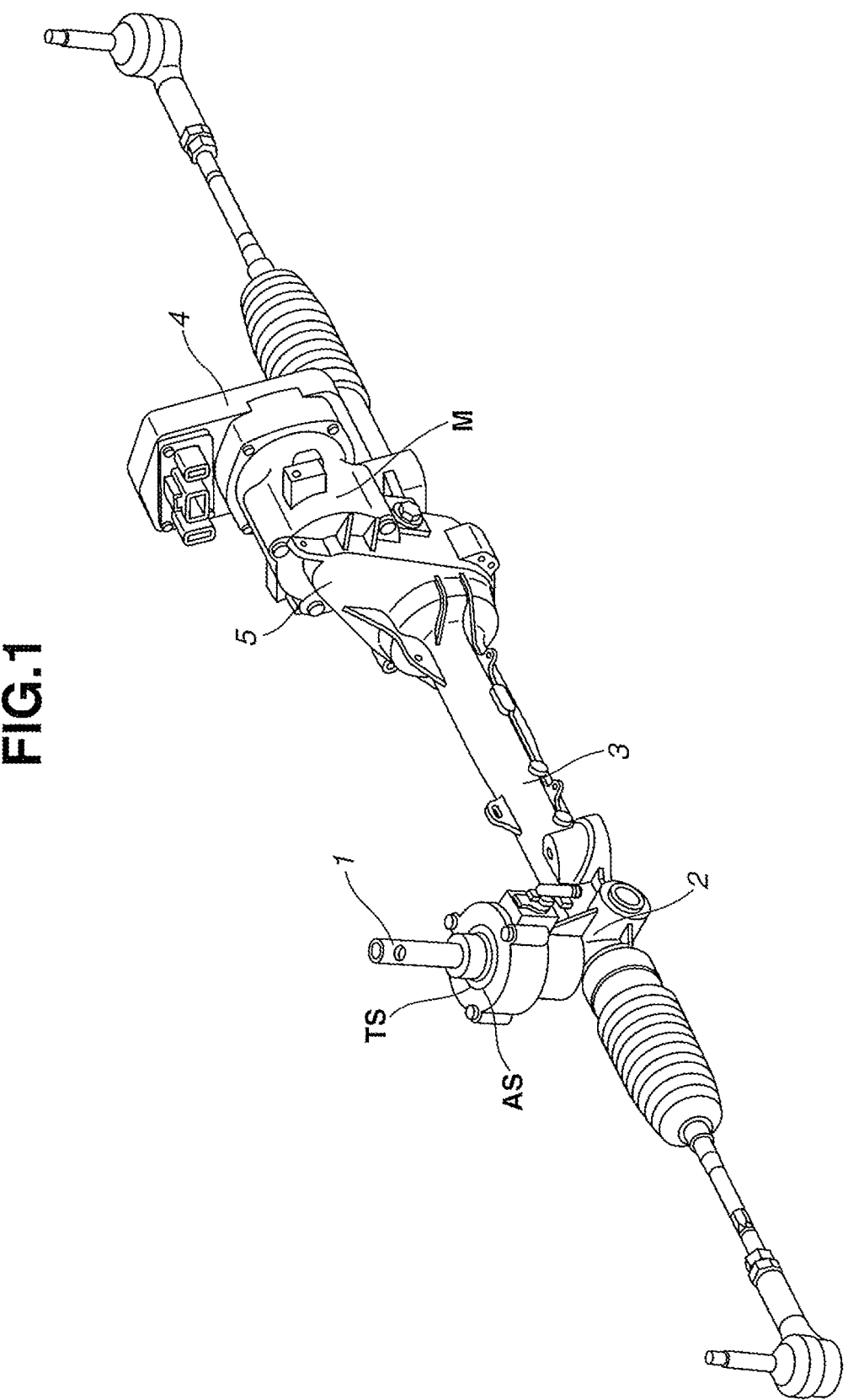
FIG. 1 is a schematic view of a power steering device that embodies the invention.

FIG. 1 is a schematic view of a power steering device of a first embodiment. In the power steering device shown in FIG. 1, there is employed a basic steering mechanism that comprises a steering wheel (not shown), a steering shaft (steering shaft) 1, a pinion shaft 2 and a rack shaft 3. When, in this steering mechanism, the steering wheel is turned by a driver, a steering torque of the steering wheel is transmitted to the pinion shaft 2 through the steering shaft 1, and at the same time, a rotational movement of the pinion shaft 2 is converted to a linear movement of the rack shaft 3, and thus left and right steered road wheels (not shown) respectively connected to both ends of the rack shaft 3 are steered. That is, the rack shaft 3 is formed with rack teeth with which the pinion shaft 2 is engaged, so that there is constituted a converting mechanism through which turning of the steering shaft 1 is converted to a steering movement with the work of the engagement between the rack teeth and the pinion shaft.

To a housing of the pinion shaft 2, there is mounted a steering torque sensor TS (for example, resolver or the like) that detects a steering angle of the steering wheel, and based on an output signal of the steering torque sensor TS, an output signal of a motor rotation angle sensor 6 (for example, resolver, IC or the like) that detects a rotation angle of a rotor of an electric motor M and a vehicle speed information, a motor control circuit (not shown) of a control device (which will be named ECU in the following) is operated to control a driving operation of the electric motor M, so that the rack shaft 3 is fed with a steering assist force from the electric motor M through a speed reduction device 5.

To an output shaft of the electric motor M, there is connected the speed reduction device 5 through which the rotation of the electric motor M is converted to the linear movement of the rack shaft 3 while being reduced in speed.

The steering shaft 1 is divided into two parts in an axial direction, which are an input shaft provided for the steering wheel and an output shaft provided for the rack shaft 3. The input shaft and the output shaft are coaxially connected through a torsion bar (not shown). With this torsion bar, the input shaft and the output shaft are rotatable relative to each other due to a torsional deflection of the torsion bar. The steering torque sensor TS is equipped with a first angle sensor that detects a rotation angle of the input shaft and a second angle sensor that detects a rotation angle of the output shaft, and based on output signals from the first and second angle sensors, a torsional amount of the torsion bar is calculated for calculating the steering torque.

Furthermore, to the torsion bar, there is connected a steering angle sensor AS (for example, MR element, IC or the like).

Figure 2:
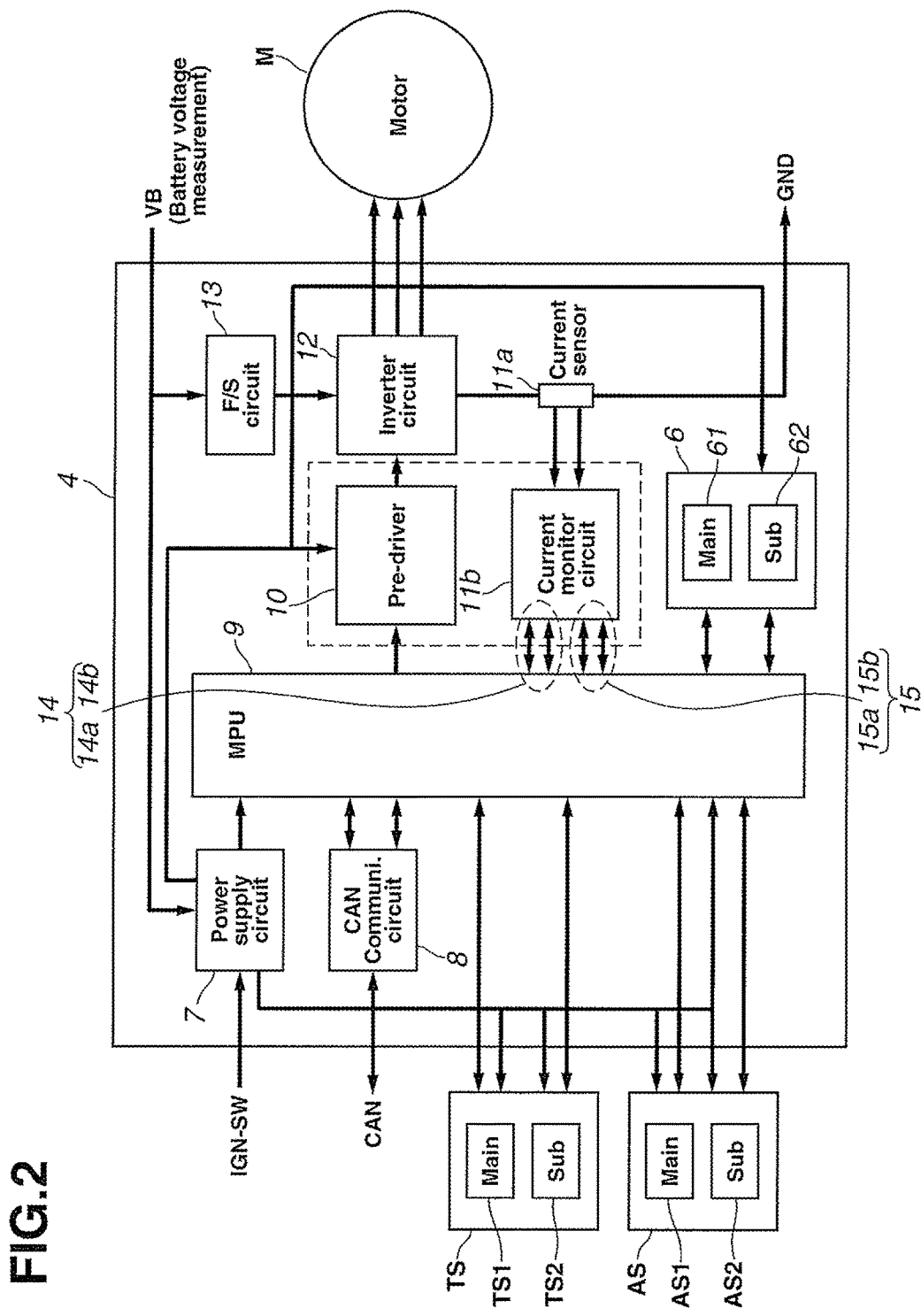
FIG. 2 is an electric system block diagram of the power steering device of the embodiment.
Figure 3:
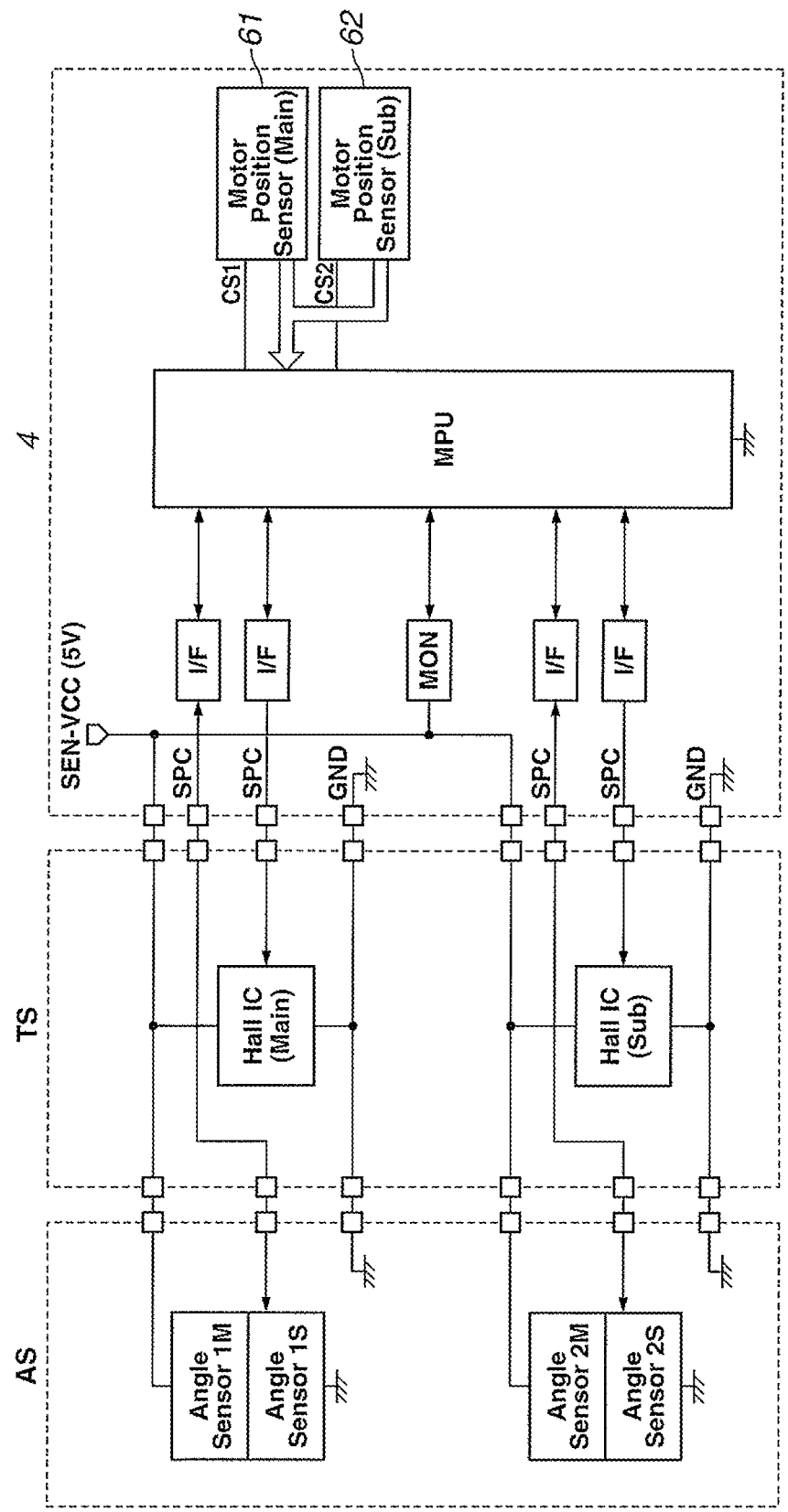
FIG. 3 is a diagram depicting input/output of a steering torque sensor and that of a steering angle sensor.

FIG. 2 is a block diagram showing a construction of the electric system, and FIG. 3 is an illustration depicting input/output of the steering torque sensor TS, the steering angle sensor AS and the motor rotation angle sensor 6. As is seen from FIGS. 2 and 3, by two, viz., Main and Sub steering torque sensors TS1 and TS2, two, viz., Main and Sub steering angle sensors AS1 and AS2 and two, viz., Main and Sub motor rotation angle sensors 61 and 62, which are each the above-mentioned first and second angle sensors, the steering torque, the steering angle and the motor rotation angle are detected, and respective steering torque detection signals Ts (Main) and Tt (Sub), respective steering angle detection signals θ s (Main) and s (Sub) and respective motor rotation angle detection signals θ m (Main) and θ m (Sub) from the above-mentioned sensors are outputted to a torque signal receiving section (not shown), a steering angle signal receiving section (not shown) and a motor rotation angle signal receiving section (not shown) which are installed in the ECU 4.

An electric power source circuit 7 functions to produce an electric power source for sensors, the MPU 9 and ICs and feed the electric power to them. A CAN communication circuit 8 functions to make a data and information exchange between it and a vehicle. The MPU 9 carries out a calculation for an assist control for EPS, a control for a motor current, a detection of abnormality of function constituting elements and a process for shifting a current condition to a safety condition. A fail-safe circuit 13 is so operated that if an abnormality of the MPU9 is detected thereby needing a shutting down of the system, the circuit 13 shuts down the electric power of the motor current based on a command from the MPU9.

A drive circuit 10 drives drive elements of an inverter circuit 12 based on a command from the MPU9. The inverter circuit 12 comprises the drive elements and is operated based on a command from the drive circuit 10. The electric motor M is driven in accordance with a current from the inverter circuit 12, and outputs a motor torque used for the steering assistance. A current flowing in a downstream part of the inverter circuit 12 is detected by a current sensor 11 that is a current detecting element.

In order to carry out a motor control, there are employed Main and Sub current detection circuits 14*a* and 14*b* which are applied with a high-response filtering processing. In order to check or monitor overcurrent of the inverter circuit 12, there are employed Main and Sub current detection circuits 15*a* and 15*b* which detect an average current and are applied with a low-response filtering processing.

Figure 4:
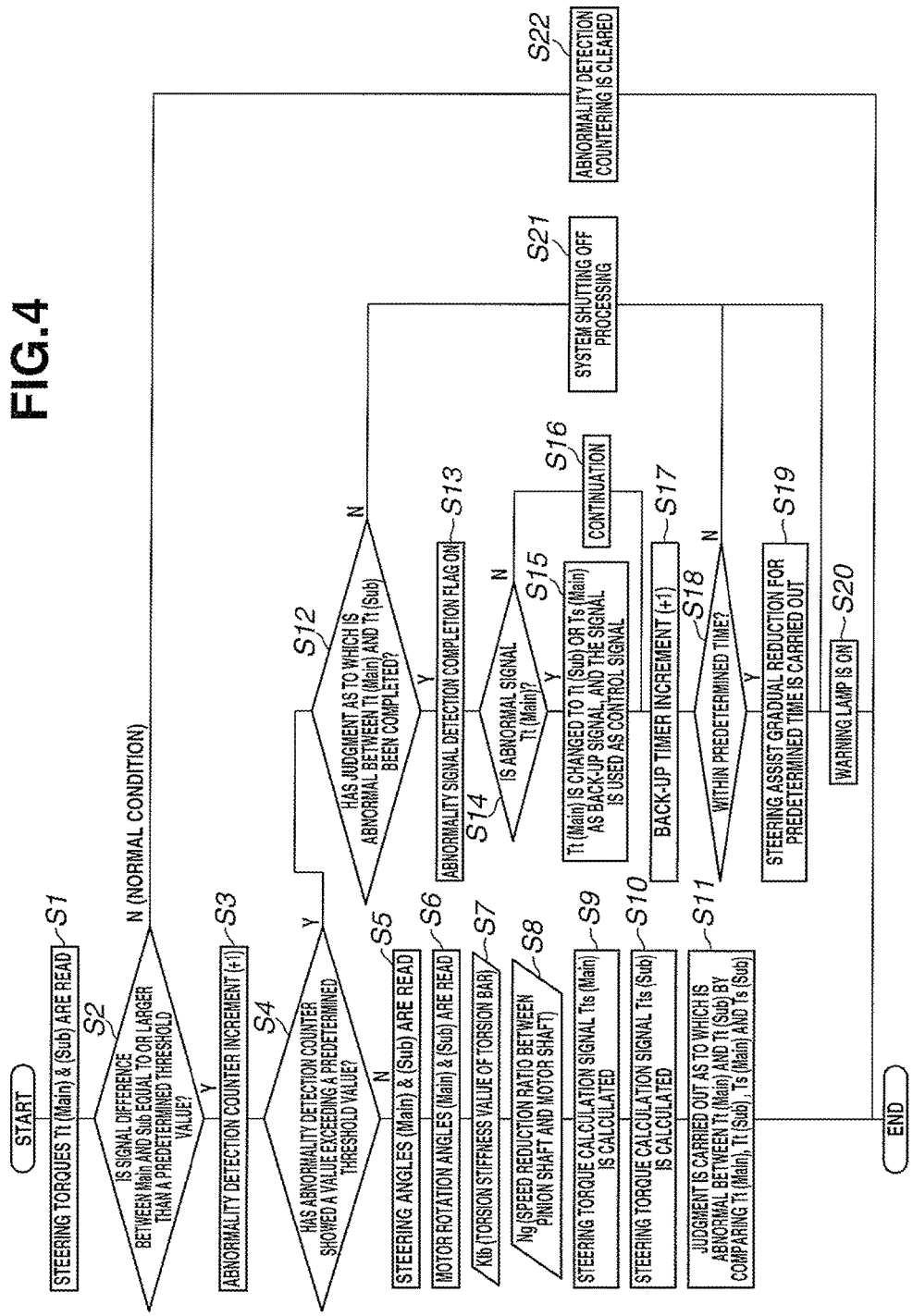
FIG. 4 is a flowchart depicting an abnormal signal detection process employed in a first embodiment.
Figure 5:
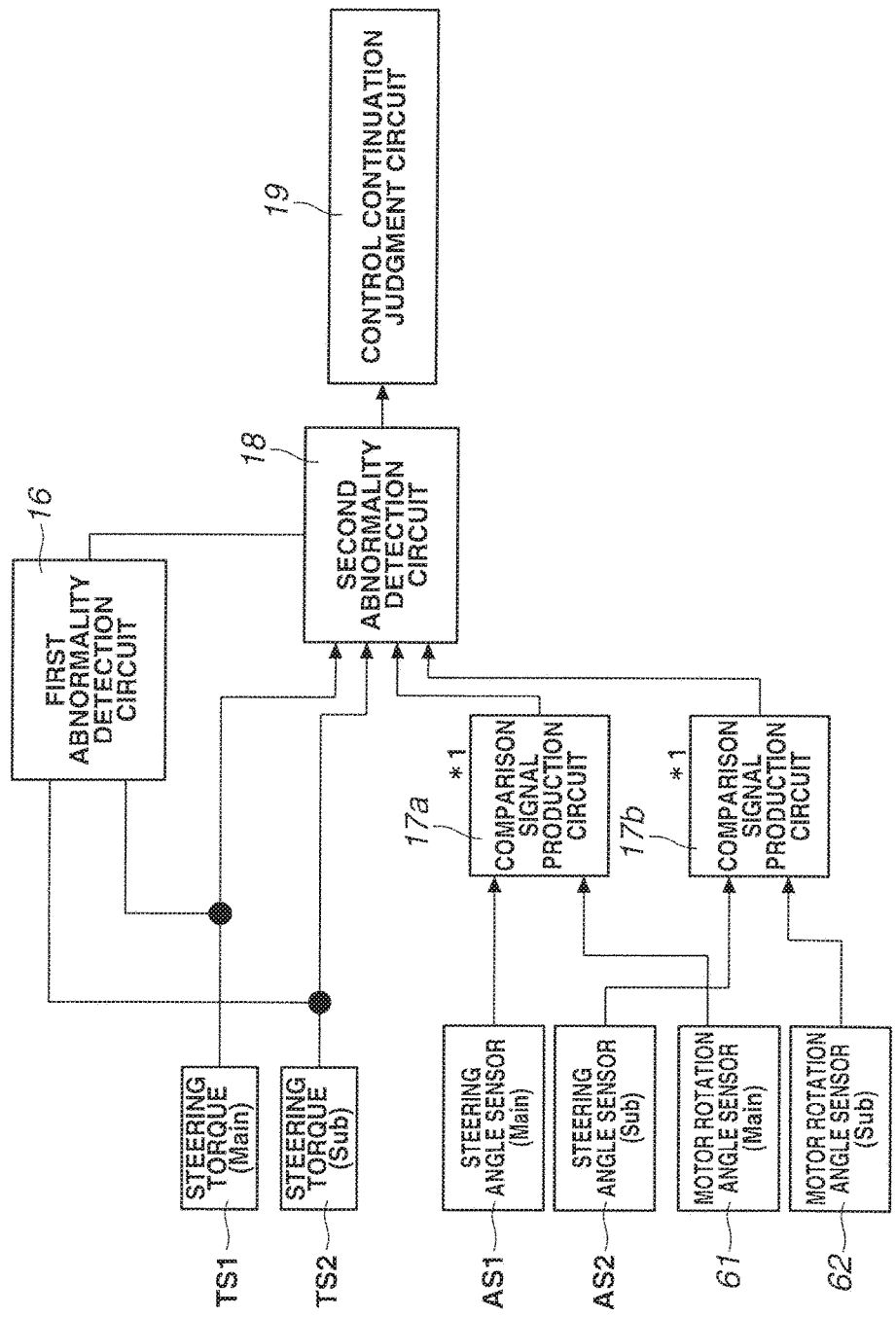
FIG. 5 is a block diagram depicting the abnormal signal detection process employed in the first embodiment.
Figure 6:
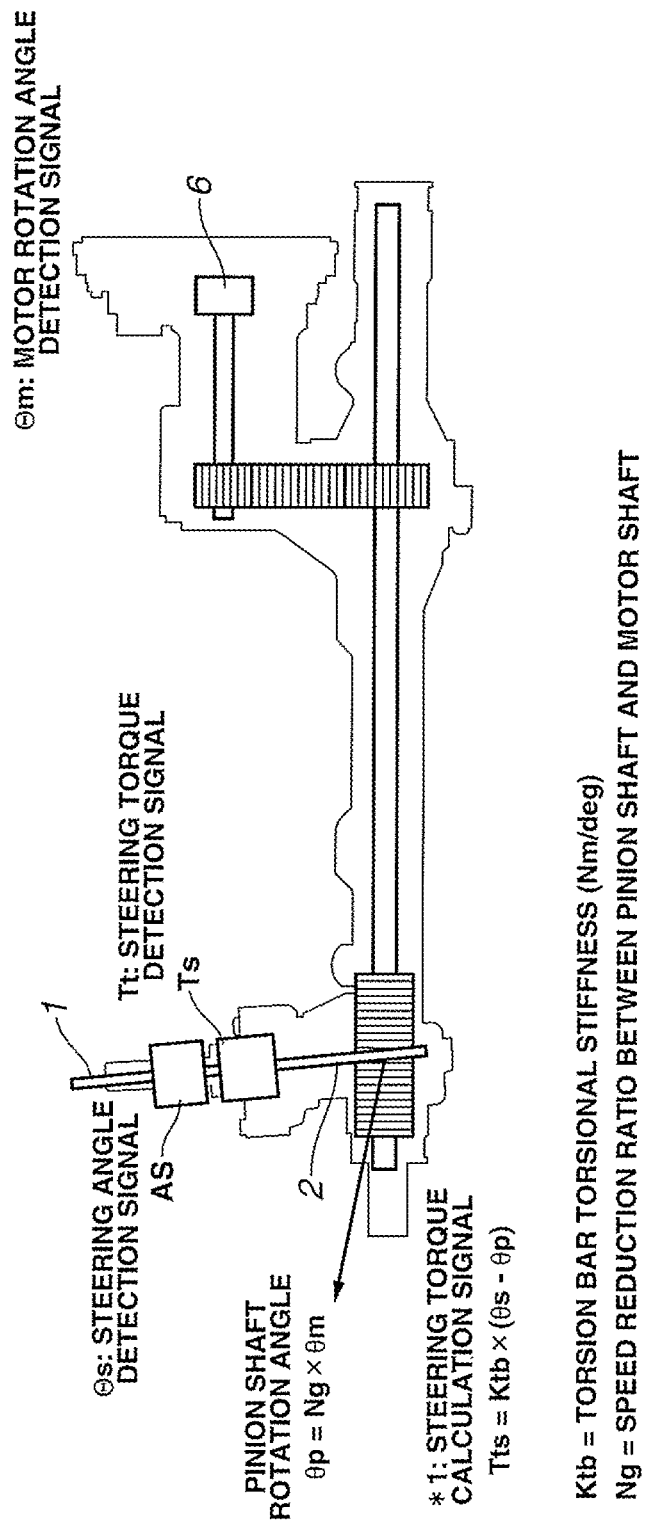
FIG. 6 is an illustration depicting a calculation method of a steering torque calculation signal.

In the following, based on the flowchart of FIG. 4, the block diagram of FIG. 5, the drawing of FIG. 6 that shows a calculation example for the steering torque calculation signal and the time chart of FIG. 7, an abnormal signal detection process employed in the first embodiment of the invention will be described.

At step S1, the steering torque detection signals Tt (Main) and Tt (Sub) respectively issued from the Main and Sub steering torque sensors Ts1 and Ts2 are read. Then, at step S2, by the first abnormal detection circuit 16, the two steering torque detection signals Tt (Main) and Tt (Sub) are compared, and judgment is carried out as to whether or not a deviation between the two signals is equal to or greater than an abnormality detection threshold value. If the deviation is equal to or greater than the threshold value, the operation flow goes to step S3, and if the deviation is smaller than the threshold value, the operation flow goes to step S22.

Figure 7:
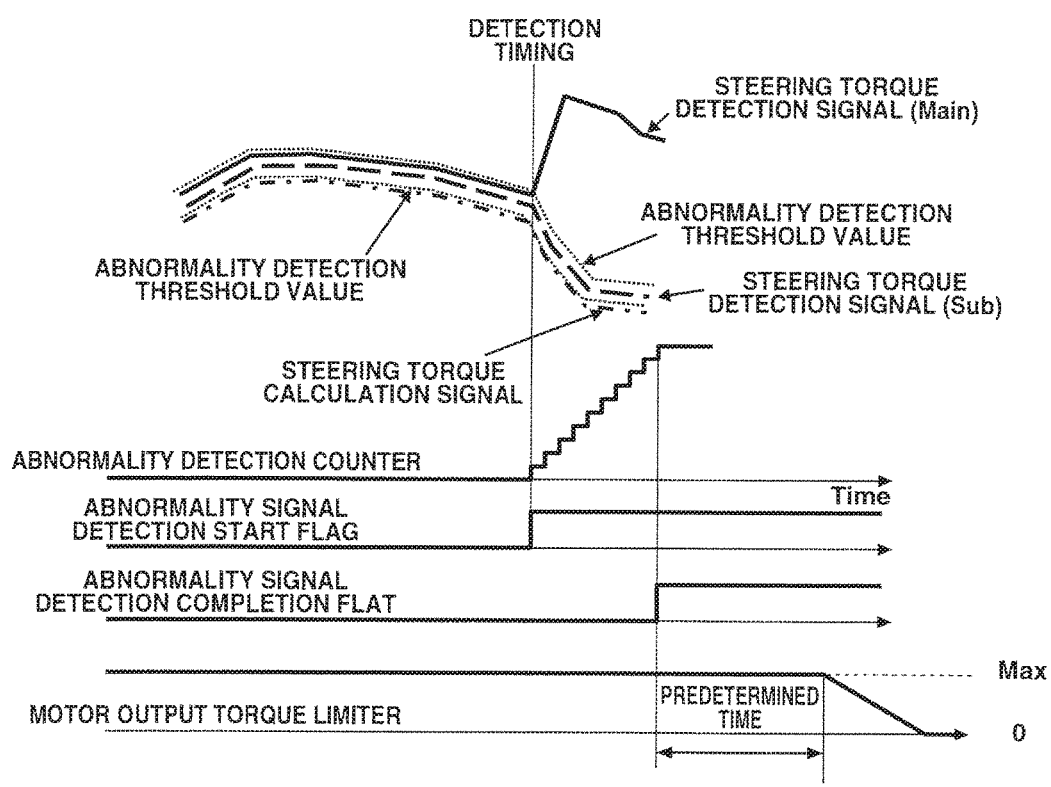
FIG. 7 is a time chart depicting the abnormal signal detection process employed in the first embodiment.

At step S3, an abnormality detection counter is subjected to increment as is seen from FIG. 7, and a flag for starting an abnormality signal detection is set. If a condition wherein the deviation between the steering torque detection signals Tt (Main) and Tt (Sub) is equal to or greater than the threshold value is continued, the abnormality detection counter is subjected to the increment at each control period. While, if at step S2 the deviation between the steering torque detection signals Tt (Main) and Tt (Sub) is smaller than the threshold value, the abnormality detection counter is cleared to 0 (zero) at step S22.

At step S4, judgment is carried out by an abnormal decision circuit (not shown) in the first abnormality detection circuit 16 as to whether or not the condition wherein the deviation between the two steering torque detection signals Tt (Main) and Tt (Sub) is equal to or greater than the threshold value for the abnormality detection is continued for a predetermined time, that is, whether the abnormality detection counter exceeds a threshold value or not. If the abnormality detection counter does not reach the threshold value, the operation flow goes to step S5, and if the abnormality detection counter reaches the threshold value, a judgment wherein either one of the two steering torque detection signals Tt (Main) and Tt (Sub) is abnormal is decided, and the operation flow goes to step S12.

At step S5, the steering angle detection signals θ s (Main) and θ s (Sub) respectively issued from the Main and Sub steering angle sensors AS1 and AS2 are read, at step S6, the motor rotation angle detection signals θ m (Main) and θ m (Sub) respectively issued from the Main and Sub motor rotation angle sensors 61 and 62 are read, at step S7, a torsional stiffness value Ktb of the torsion bar is read and at step S8, a speed reduction ratio Ng between the pinion shaft 2 and the motor shaft is read.

Then, at step S9, by a first comparison signal production circuit 17a, a steering torque calculation signal (Main) is calculated based on the steering angle detection signal θ s (Main), the motor rotation angle detection signal θ m (Main), the torsional stiffness value Ktb of the torsion bar and the speed reduction ratio Ng between the pinion shaft 2 and the motor shaft.

Now, a method for calculating the steering torque calculation signal Tts (Main) will be described with reference to FIG. 6. By multiplying a relative angle between upstream and downstream portions of the torsion bar by the torsional stiffness value Ktb of the torsion bar, the steering torque calculation signal Tts is obtained. The angle of the upstream portion of the torsion bar is detected by using the steering angle detection signal θ s (Main). While, the angle of the downstream portion of the torsion bar (viz., rotation angle of the pinion shaft 2) is calculated by multiplying the motor rotation angle detection signal θ m (Main) and the speed reduction rate Ng between the pinion shaft 2 and the motor shaft. That is, the steering torque calculation signal Tts (Main) is obtained from the following equation (1).

$$Tts = Ktb \times (\theta s - \theta p) \qquad (1)$$

Then, at step S10, by a second comparison signal production circuit 17b, a steering torque calculation signal (Sub) is calculated based on the steering angle detection signal θ s (Sub), the motor rotation angle detection signal θ m (Sub), the torsional stiffness value Ktb of the torsion bar and the speed reduction ratio Ng between the pinion shaft 2 and the motor shaft. Method of calculating the steering torque calculation signal Tts (Sub) is the same as that of the steering torque calculation signal Tts (Main).

At step S11, by a second abnormality detection circuit 18, a comparison among the steering torque detection signal Tt (Main), the steering torque detection signal Tt (Sub), the steering torque calculation signal Tts (Main) and the steering torque calculation signal Tts (Sub) is carried out, and judgment is so made that values of signals that are the same or close to one another are normal, and values other than the normal are abnormal.

If at step S4 it is judged that the abnormality detection counter has reached the threshold value, the operation flow goes to step S12. At this step S12, before the abnormality judgment at step S11, by a control continuation judgment circuit 19, judgment is carried out as to whether judgment for judging which is normal or abnormal between the steering torque detection signal Tt (Main) and the steering torque detection signal Tt (Sub) is established or not. If it is established, the operation flow goes to step S13, while, if it is not established, the operation flow goes to step S21. At step S21, the drive control by the motor control circuit is stopped.

As is seen from FIG. 7, at step S13, an abnormality detection completion flag is set ON, and at step S14, judgment is carried out as to whether the abnormal signal is the steering torque detection signal Tt (Main) or not. If the abnormal signal is judged as the steering torque detection signal Tt (Main), the operation flow goes to step S15, and at this step, the signal, among the steering torque detection signal Tt (Sub), the steering torque calculation signal Tts (Main) and the steering torque calculation signal Tts (Sub), that has been judged as a signal of normal value is changed to a back-up signal and the drive control by the motor control circuit is continued due to the back-up signal that has been judged as normal signal.

When the judgment is so made that the abnormal signal is not the steering torque detection signal Tt (Main), (that is, when the abnormal signal is judged as the steering torque detection signal Tt (Sub)), the operation flow goes to step S16, and the drive control by the motor control circuit is further continued due to the steering torque detection signal Tt (Main).

Then, at step S17, a back-up timer is subjected to increment, and at step S18, judgment is carried out as to whether or not a predetermined time (0 to several seconds) has passed from the time when the abnormality signal detection completion flag was set ON, and a warning lamp is turned ON (step S20). Until a predetermined time, the steering assist control is continued, and after passing the predetermined time, at step S19, the control amount of the steering assist is gradually reduced and finally reduced to a manual steering degree.

As is mentioned hereinabove, by gradually reducing the amount of the steering assist control after passing a predetermined time from the time when abnormality of the steering torque detection signal Tt (Main) or the steering torque detection signal Tt (Sub) was detected and thus warning lamp was turned ON, movement of the vehicle to a safety place is possible prior to the complete stopping of the steering assist control. Furthermore, by gradually reducing the steering assist amount in accordance with passage of time, continuous driving by the driver is suppressed and thus safety driving is improved.

In the first embodiment, in case where a normal value is calculated based on decision by majority of the signals, the steering assist can be continued by using the normal value, and thus, the steering load applied to the driver can be reduced. While, in case where a normal value can't be calculated even though an abnormality is established, safety can be increased by stopping or limiting the steering assist operation.

Since the steering torque detection signals Tt (Main) and Tt (Sub) are of a type that outputs a signal representing an angle of the steering shaft, comparison of the signals is easy and thus early abnormal detection with a high accuracy is obtained.

Furthermore, since the steering torque calculation signals Tts (Main) and Tts (Sub) are calculated based on the steering angle detection signals θ s (Main) and θ s (Sub) and the motor rotation angle detection signals θ m (Main) and θ m (Sub), comparison to the steering torque detection signals Tt (Main) and Tt (Sub) is possible. Furthermore, since the normal value is calculated based on decision by majority of the three or more signals (four in the first embodiment), a high accuracy normal value can be obtained. Furthermore, judgment for judging which detection signal is abnormal is possible at an early time from the abnormality occurrence, and thus, judging accuracy is increased.

By using output signals from different detection elements, preferably sensors that are different in detection method, the steering torque detection signals Tt (Main) and Tt (Sub) used for a comparison carried out in the first abnormality detection circuit 16 have a low possibility of showing a similar tendency when the detected signals show an abnormality against an environmental change, and thus, the accuracy of detecting the abnormality is increased.

Second Embodiment

In the first embodiment, abnormality of the steering torque detection signals Tt (Main) and Tt (Sub) issued from the steering torque sensors TS1 and TS2 is detected or judged. While, in the second embodiment, abnormality of steering angle detection signals θ s (Main) and θ s (Sub) issued from the steering angle sensors AS1 and AS2 is detected or judged.

Figure 9:
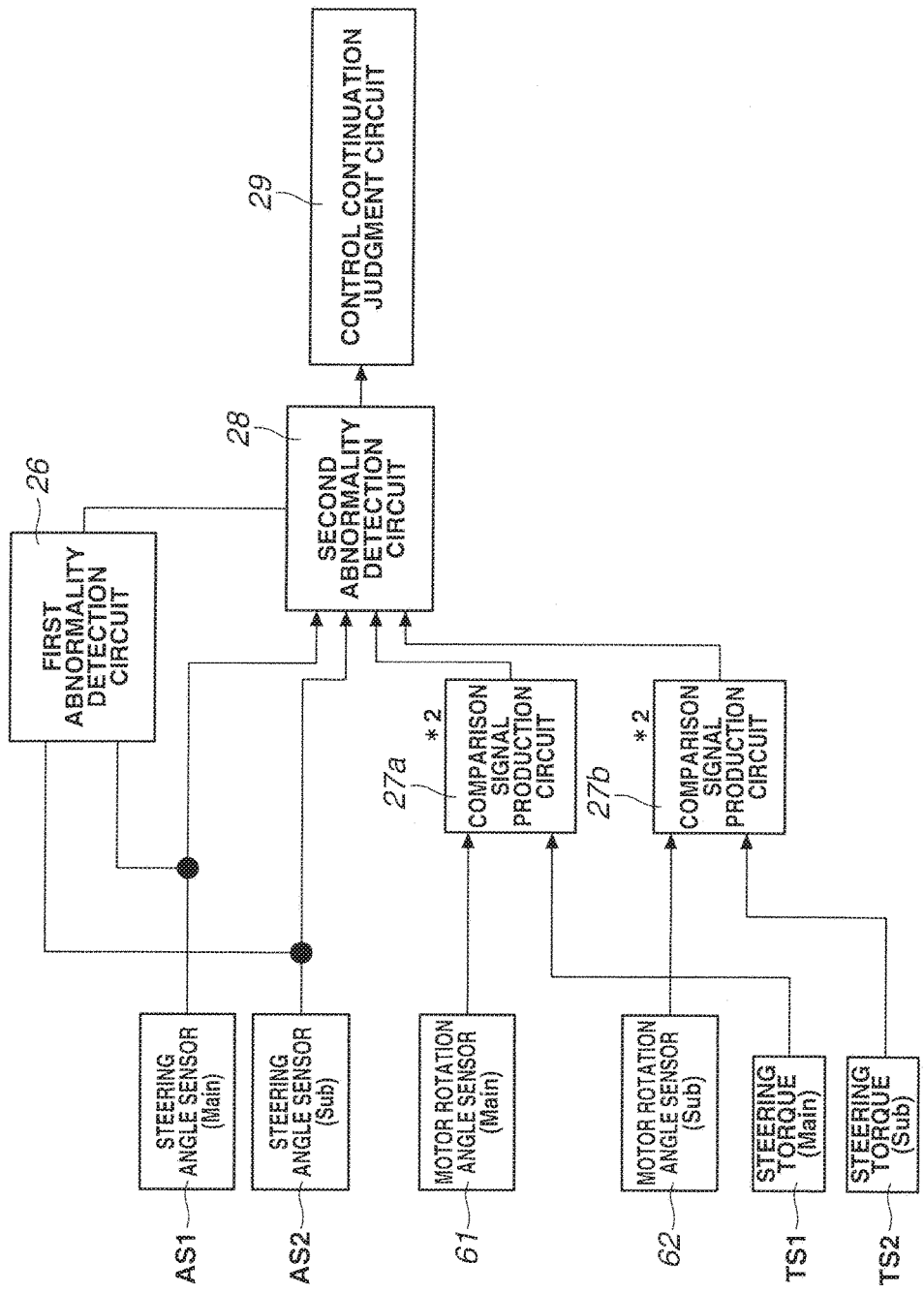
FIG. 9 is a block diagram depicting the abnormal signal detection process employed in the second embodiment.
Figure 10:
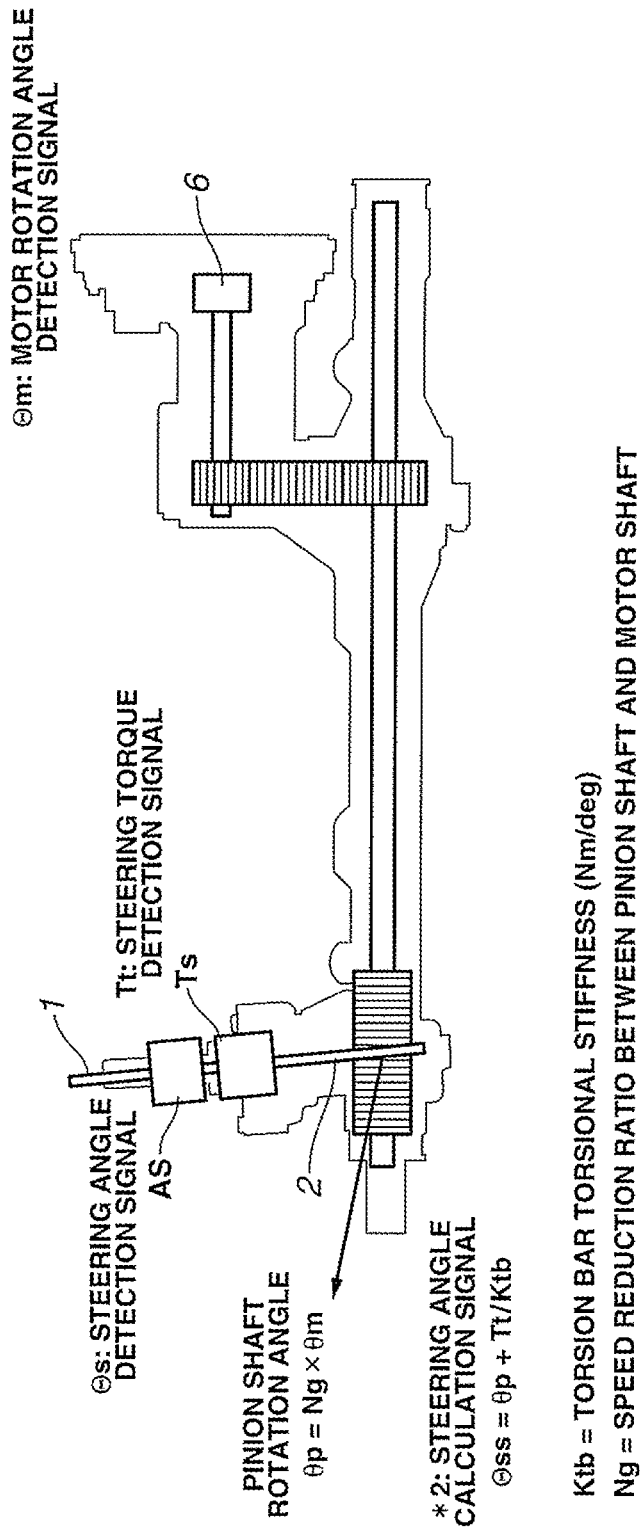
FIG. 10 is an illustration depicting a calculation method of a steering angle calculation signal.
Figure 11:
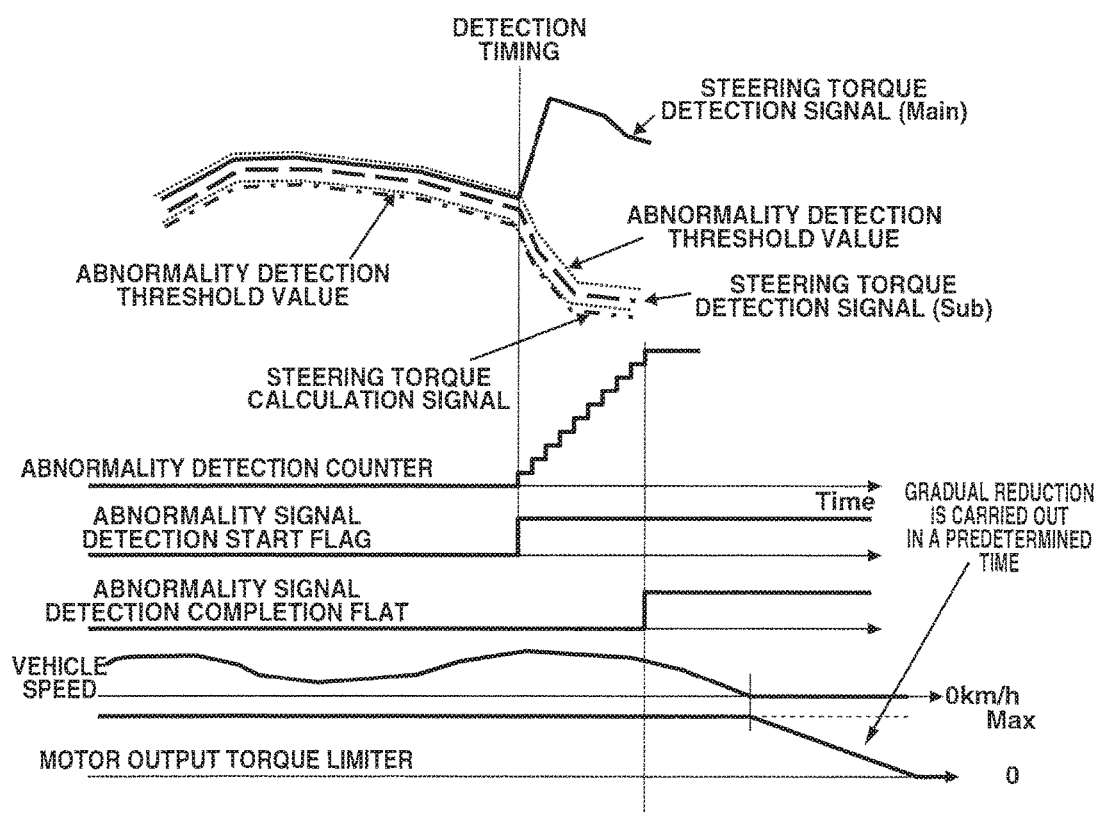
FIG. 11 is a time chart depicting the abnormal signal detection process employed in the second embodiment.

The power steering device of the second embodiment will be described in the following with reference to FIG. 8 that shows a flowchart, FIG. 9 that shows an abnormality detection block diagram for the steering angle detection signal, FIG. 10 that shows an example for calculating the steering angle calculation signal and FIG. 11 that shows a time chart.

Figure 8:
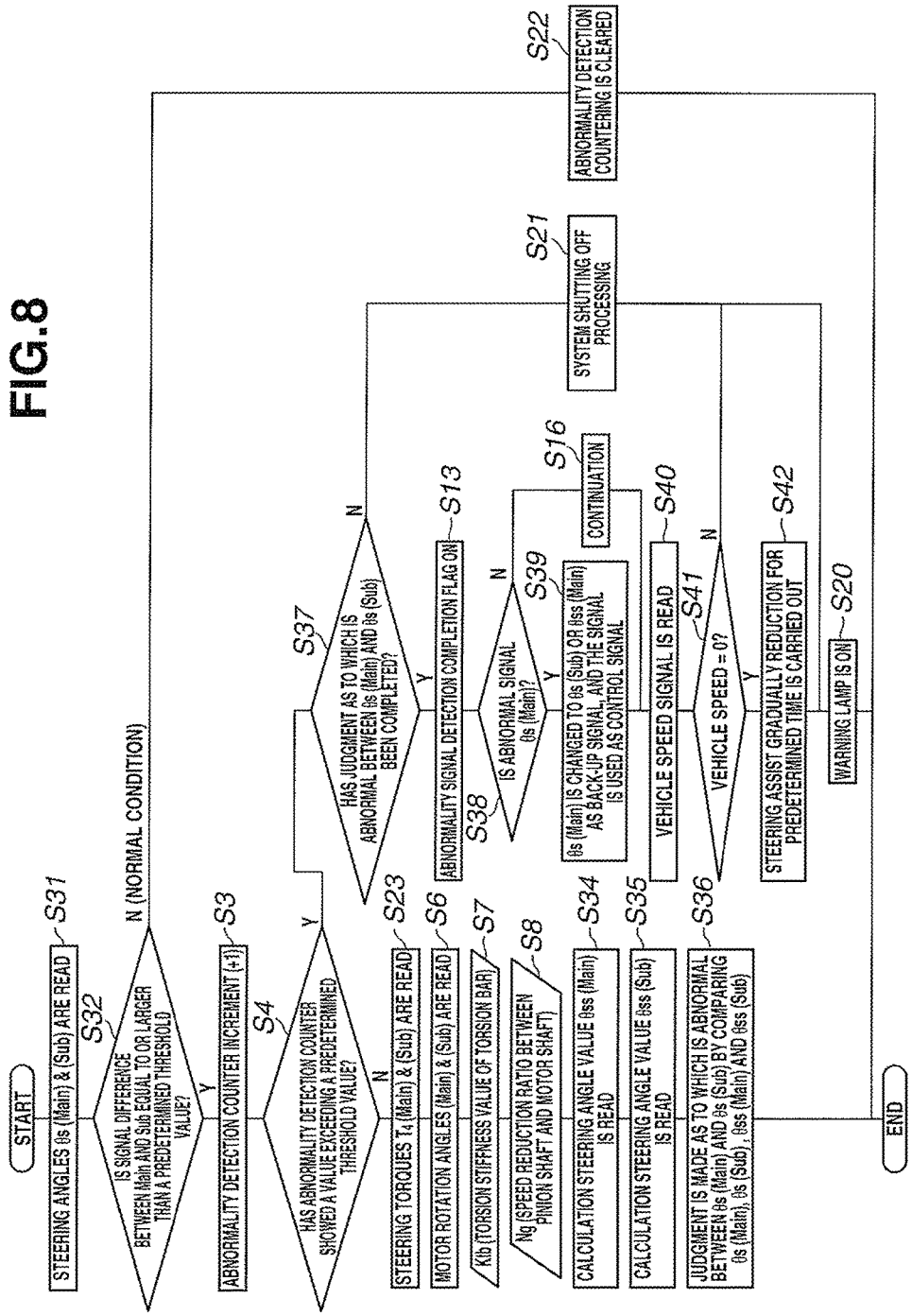
FIG. 8 is a flowchart depicting an abnormal signal detection process employed in a second embodiment.

As will be seen from FIG. 8, in the second embodiment, steps S3, S4, S6 to S8, S13, S16, and S20 to S22 are the same as those of the first embodiment. Thus, in the following explanation, the same steps as those of the first embodiment will be omitted and only steps that are different from those of the first embodiment will be described.

At step S31, the steering angle detection signals θ s (Main) and θ s (Sub) issued from the Main and Sub steering angle sensors AS1 and AS2 are red. Then, at step S32, by using a first abnormality detection circuit 26, the steering angle detection signals θ s (Main) and θ s (Sub) are compared for judging whether a deviation between the two signals is equal to or greater than an abnormality detection threshold value or not. If the deviation is equal to or greater than the abnormality detection threshold value, the operation flow goes to step S3, and if the deviation is smaller than the abnormality detection threshold value, the operation flow goes to step S22.

In the second embodiment, for detecting the abnormality of the steering angle detection signals θ s (Main) and θ s (Sub), steering angle calculation signals θ ss (Main) and θ ss (Sub) are calculated in first and second comparison signal production circuits 27a and 27b.

First, at step S33, the steering torque detection signals Tt (Main) and Tt (Sub) issued from the Main and Sub steering torque sensors TS1 and TS2 are read, at step S6, motor rotation angle detection signals θ m (Main) and θ m (Sub) issued from the Main and Sub motor rotation angle sensors 61 and 62 are read, at step S7, the torsional stiffness value Ktb of the torsion bar is read and at step S8, the speed reduction ratio between the pinion shaft 2 and the motor shaft is read.

Then, at step S34, in the first comparison signal production circuit 27a, the steering angle calculation signal θ ss (Main) is calculated based on the steering torque detection signal Tt (Main), the motor rotation angle detecting signal θ m (Main), the torsional stiffness value Ktb of the torsion bar and the speed reduction ratio Ng between the pinion shaft 2 and the motor shaft.

Now, the method for calculating the steering angle calculation signal θ ss (Main) will be described with reference to FIG. 10. By multiplying the motor rotation angle detection signal θ m by the speed reduction ratio Ng between the pinion shaft 2 and the motor shaft, a rotation angle θ p of the pinion shaft 2 is obtained. Furthermore, by dividing the steering torque detection signal Tt by the torsional stiffness value Ktb, a torsional angle T/Ktb of the torsion bar is calculated. When a torsion appears in the torsion bar, there is produced, between the steering angle and the rotation angle θ p of the pinion shaft 2, a difference in the amount of the torsion of the torsion bar. Thus, by adding the rotation angle θ p of the pinion shaft 2 to the torsional angle T/Ktb of the torsion bar, the steering angle calculation signal θ ss (Main) can be calculated as will be understood from the following equation (2).

$$\theta ss = \theta p + T/Ktb \qquad (2)$$

In case where the steering angle sensor AS is positioned at a steered road wheel side relative to the torsion bar, the rotation angle θ p of the pinion shaft 2 becomes the steering angle calculation signal θ ss, and the torsional angle T/Ktb of the torsion bar becomes unnecessary.

Then, at step S36, in the second comparison signal production circuit 27b, the steering angle calculation signal θ ss (Sub) is calculated based on the steering torque detection signal Tt (Sub), the motor rotation angle detection signal θ m (Sub), the torsional stiffness value Ktb of the torsion bar and the speed reduction ratio between the pinion shaft 2 and the motor shaft. The method of calculating the steering angle calculation signal θ ss (Sub) is the same as that of the above-mentioned steering angle calculation signal θ ss (Main).

Steps S36 to S39 are the same as the above-mentioned S11, S12, S14 and S15 except that in steps S36 to S39, the steering torque detection signal Tt (Main) is replaced by the steering angle detection signal θ s (Main), the steering torque detection signal Tt (Sub) is replaced by the steering angle detection signal θ s (Sub), the steering torque calculation signal Tts (Main) is replaced by the steering angle calculation signal θ ss (Main), and the steering torque calculation signal Tts (Sub) is replaced by the steering angle calculation signal θ ss (Sub).

In the first embodiment, by the steps S17 to S20, the steering assist control amount is gradually reduced after a predetermined time and finally a manual steering is carried out. While, in the second embodiment, the following steps S40 to S42 are carried out.

First, at step S40, a vehicle speed signal is read, and at step S41, judgment is carried out as to whether the vehicle speed is 0 (zero) or not (that is, whether the vehicle stops or not). As is seen from FIG. 11, if the vehicle speed is 0 (zero), the steering assist control amount is gradually reduced at step S42. That is, when the vehicle is under cruising, the steering assist control is continued until stopping of the vehicle, and thereafter, at the time when the vehicle speed becomes 0 (zero) (that is, the vehicle stops), the steering assist control amount is gradually reduced and finally the manual steering is carried out.

As is described in the above, in the second embodiment, substantially the same effects as those of the first embodiment are obtained.

Since both the steering angle detection signals θ s (Main) and θ s (Sub) output signals representing an angle of the steering shaft, the comparison carried out in the first abnormality detection circuit 26 can be easily made and thus early detection of the abnormal state can be made with a high detection accuracy.

When the steering angle sensors AS1 and AS2 are positioned at a steering wheel side relative to the torsion bar and when a torsion appears in the torsion bar, there is produced, between the steering angle and the motor rotation angle, a difference in the amount of the torsion of the torsion bar. Thus, by correcting the difference, a much higher accuracy normal value can be obtained in the second abnormality detection circuit 28.

Both the steering angle and the motor rotation angle are of an angular information, and thus, in case where the steering angle sensors AS1 and AS2 are positioned at the steered road wheel side relative to the torsion bar, calculation from the motor rotation angle detection signals θ m (Main) and θ m (Sub) to the steering angle calculation signals θ ss (Main) and θ ss (Sub) becomes possible by correcting the speed reduction data of the speed device 5. In this case, a normal value is calculated in the second abnormality detection circuit, and thus a normal value with a high accuracy can be obtained.

In case where the vehicle speed is lower than a predetermined level (vehicle speed is 0 (zero) in the second embodiment), safety of the vehicle is obtained. By keeping the steering assist control until the vehicle speed is reduced to the predetermined level and thereafter stopping the steering assist control, restart of the vehicle with an abnormal state can be suppressed.

Third Embodiment

In the third embodiment, abnormality of the motor rotation angle detection signals θ m (Main) and θ m (Sub) issued from the motor rotation angle sensors 61 and 62 is detected.

Figure 13:
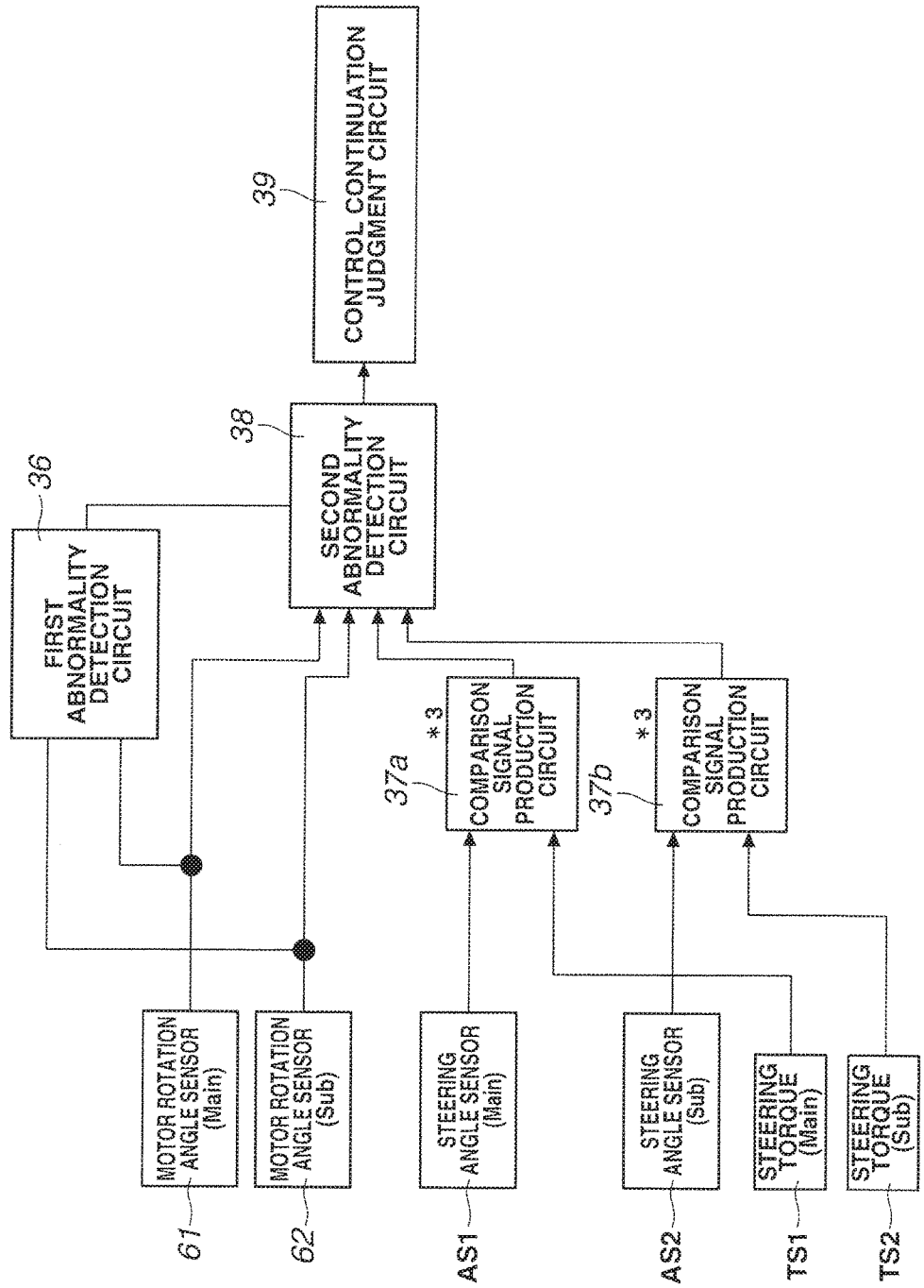
FIG. 13 is a block diagram depicting the abnormal signal detection process employed in the third embodiment.
Figure 14:
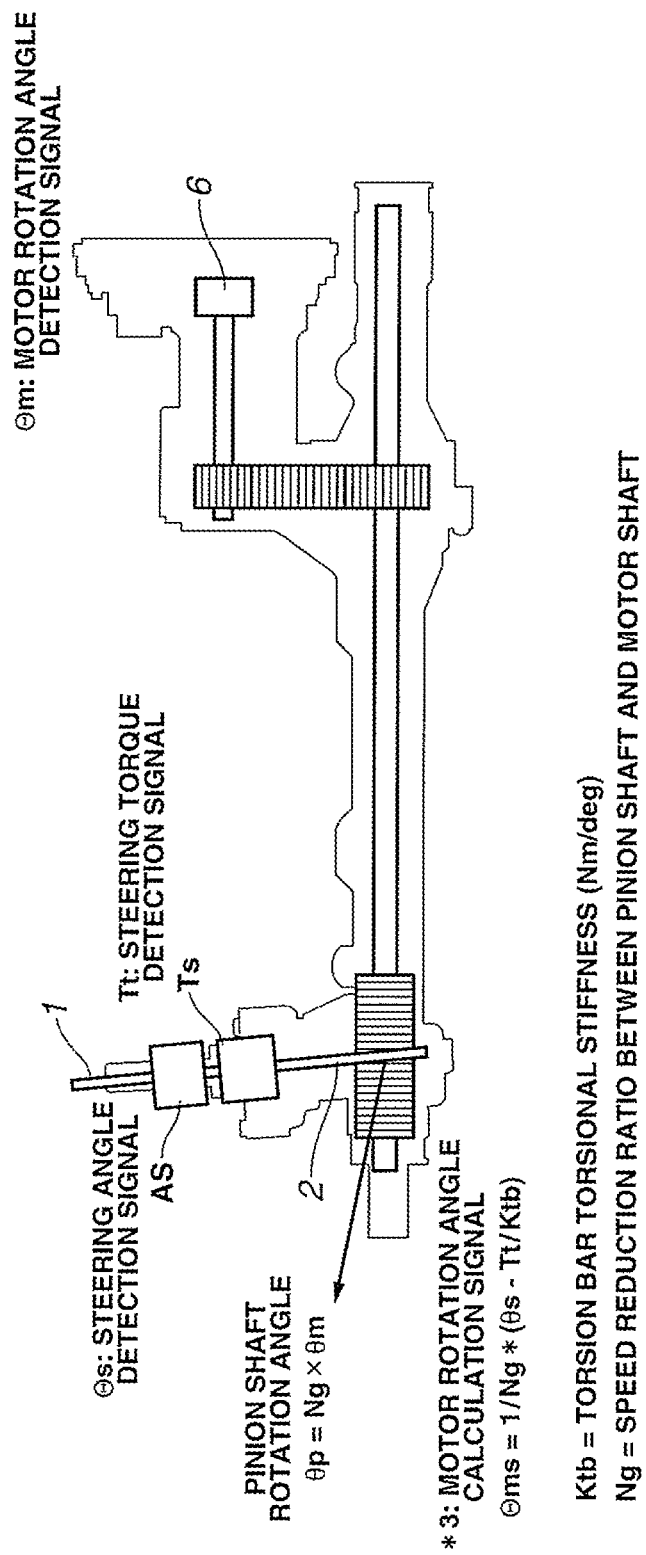
FIG. 14 is an illustration depicting a calculation method of a motor rotation angle calculation signal.

The power steering device of the third embodiment will be described in the following with reference to FIG. 12 that shows a flowchart, FIG. 13 that shows an abnormality detection block diagram for the motor rotation angle detection signal, FIG. 14 that shows an example for calculating the motor rotation angle calculation signal and FIG. 15 that shows a time chart.

Figure 12:
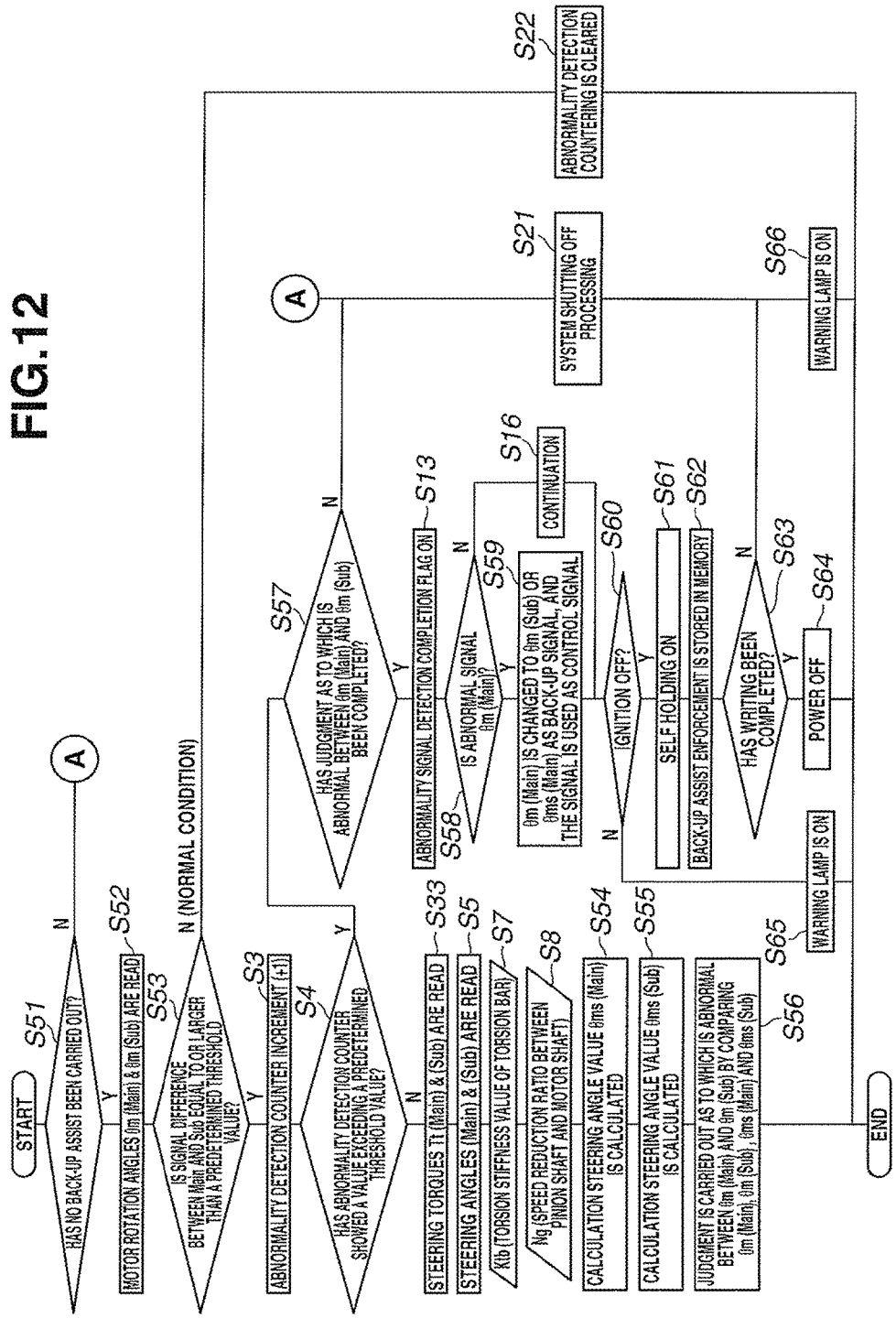
FIG. 12 is a flowchart depicting an abnormal signal detection process employed in a third embodiment.

As will be seen from FIG. 12, in the third embodiment, steps S3, S4, S5, S7, S8, S13, S16, and S21 to S22 are the same as those of the first embodiment. Thus, in the following explanation, the same steps as those of the first embodiment will be omitted and only steps that are different from those of the first embodiment will be described.

First, at step S51, judgment is carried out as to whether an execution history of a back-up assist is present or not, and if the execution history of the back-up assist is not present, the operation flow goes to step S52 and if the execution history is present, the operation flow goes to step S21.

Then, at step S52, the motor rotation angle detection signals θ m (Main) and θ m (Sub) issued from the Main and Sub motor rotation angle sensors 61 and 62 are read. At step S53, by using the first abnormality detection circuit 36, comparison between the motor rotation angle detection signals θ m (Main) and θ m (Sub) is carried out for judging whether a deviation between these two signals is equal to or greater than an abnormality detection threshold value or not. If the deviation is equal to or greater than the abnormality detection threshold value, the operation flow goes to step S3, and if the deviation is smaller than the abnormality detection threshold value, the operation flow goes to step S22.

In the third embodiment, for detecting the abnormal state of the motor rotation angle sensors 61 and 62, the motor rotation angle calculation signals θ s (Main) and θ s (Sub) are calculated in the comparison signal production circuits 27a and 27b.

First, at step S33, the steering torque detection signals Tt (Main) and Tt (Sub) issued from the Main and Sub steering torque sensors TS1 and TS2 are read, and at step S5, the steering angle detection signals θ s (Main) and θ s (Sub) issued from the Main and Sub steering angle sensors AS1 and AS2 are read, and at step S7, the torsional stiffness value Ktb of the torsion bar is read and at step S8, the speed reduction ratio between the pinion shaft 2 and the motor shaft is read.

Then, at step S54, in the first comparison signal production circuit 37a, the motor rotation angle calculation signal θ ms (Main) is calculated based on the steering torque detection signal Tt (Main), the steering angle detection signal θ s (Main), the torsional stiffness value Ktb of the torsion bar and the speed reduction ratio Ng between the pinion shaft and the motor shaft.

Now, the method for calculating the motor rotation angle calculation signal θ ms (Main) will be described with reference to FIG. 14. That is, a value Tt/Ktb obtained by dividing the steering torque detection signal Tt (Main) by the torsional stiffness value Ktb subtracts from the steering angle detection signal θ (Main), and the result is multiplied with the speed reduction ratio Ng between the pinion shaft 2 and the motor shaft. And, by dividing 1 by the result "Ng×(θ s−Tt/Ktb)", the motor rotation angle calculation signal θ ms (Main) can be obtained. That is, the motor rotation angle calculation signal θ ms has the following equation (3).

$$\theta ms = 1/Ng \times (\theta s - Tt/Ktb) \quad (3)$$

If the steering angle sensor AS is positioned at the steered road wheel side relative to the torsion bar, the steering angle detection signal θ s shows the rotation angle θ p of the pinion shaft 2, and thus in this case, Tt/Ktb becomes unnecessary.

Then, at step S55, in the second comparison signal production circuit 37b, the motor rotation angle calculation signal θ ms (Sub) is calculated based on the steering torque detection signal Tt (Sub), the steering angle detection signal θ s (Sub), the torsional stiffness value Ktb of the torsion bar and the speed reduction ratio Ng between the pinion shaft 2 and the motor shaft. The method of calculating the motor rotation angle calculation signal θ ms (Sub) is the same as that of the motor rotation angle calculation signal θ ms (Main).

Steps S56 to S59 are the same as the above-mentioned S11, S12, S14 and S15 expect that in steps S56 to S59, the steering torque detection signal Tt (Main) is replaced by the motor rotation angle detection signal θ m (Main), the steering torque detection signal Tt (Sub) is replaced by the motor rotation angle detection signal θ m (Sub), the steering torque calculation signal Tts (Main) is replaced by the motor rotation angle calculation signal θ ms (Main) and the steering torque calculation signal Tts (Sub) is replaced by the motor rotation angle calculation signal θ ms (Sub).

In the first embodiment, in the period of S17 to S20, the steering assist control amount is gradually reduced after a predetermined time and finally the manual steering is carried out. While, in this third embodiment, the following process depicted by S60 to S66 is carried out.

In the following, the detail will be described. At step S60, judgment is carried out as to whether ignition-off has been made or not, and if the ignition-off has not been made, the operation flow goes to step S65 to turn on a warning lamp. If the ignition-off has been made, the operation flow goes to step S61.

Figure 15:
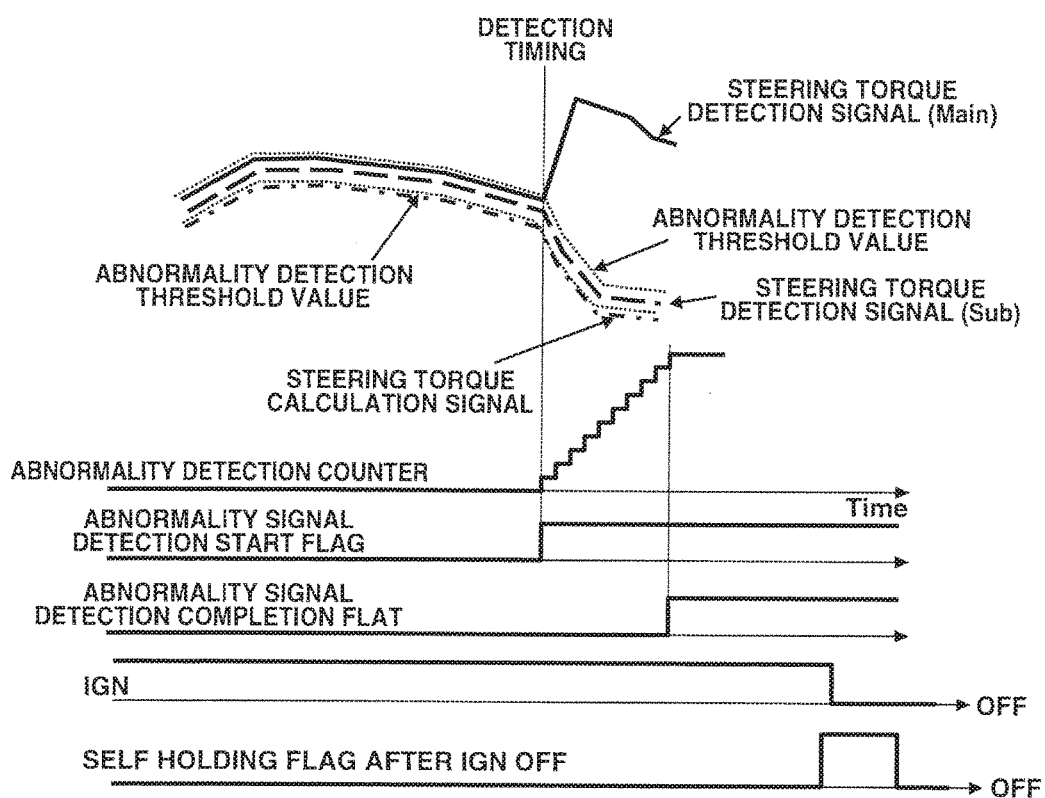
FIG. 15 is a time chart depicting the abnormal signal detection process employed in the third embodiment.

As is seen from FIG. 15, at step S61, a self-holding function is turned ON. The self-holding function has the following function. That is, when, with the electric motor M and the driving elements being highly heated, the ignition-off is made, turning-off of a microcomputer and other electric parts is kept suppressed for a predetermined time until the temperature of the electric motor M and the driving elements is reduced to a lower level. That is, if the ignition-on is made before the temperature of the electric motor and the driving elements is not sufficiently reduced, starting of the steering assist control is suppressed. By using this self-holding function, an execution history of the back-up assist is stored in a memory at step S62. At step S63, judgment is carried out as to whether writing to the memory is finished or not, so that warning lamp is kept ON until the writing is finished (S66), and the microcomputer and other electric parts are turned off when the writing to the memory is finished.

When, after writing the execution history for the back-up assist to the memory, the ignition-on is made again, judgment is carried out at step S51 as to whether the back-up assist has been carried out or not and if NO, the operation flow goes to step S21 to stop the steering assist control.

As is described hereinabove, in the third embodiment, the same operation effects as that of the first embodiment are obtained.

When, after the ignition switch is turned off, the ignition switch is turned on again, safety of the vehicle is ensured because the vehicle is at a standstill condition. By, under this condition, stopping the steering assist, restarting of a vehicle running that may include an abnormal condition can be suppressed.

Fourth Embodiment

In the fourth embodiment, abnormality of a current detection signal used for a power steering device control (which will be named EPS control in the following) by the inverter circuit 12 and abnormality of a current detection signal for detecting overcurrent are detected.

A control device for a vehicle-mounted instrument, which is the fourth embodiment, will be described with reference to FIG. 16 that shows a flowchart and FIG. 17 that shows an abnormality detection block diagram for the current detection signal.

Figure 16:
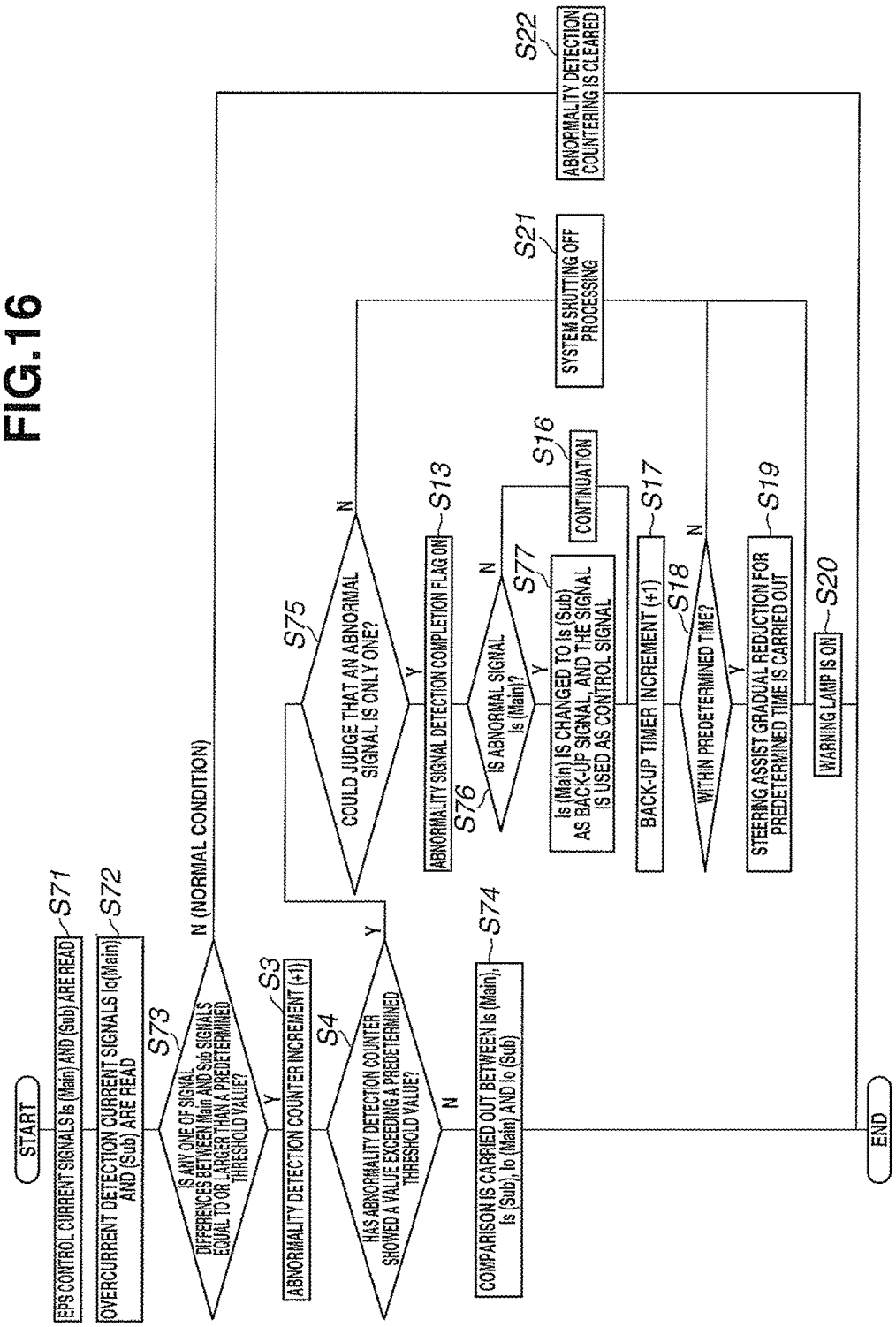
FIG. 16 is a flowchart depicting an abnormal signal detection process employed in a fourth embodiment.

As is seen from FIG. 16, steps S3, S4, and S13 to S22 in the fourth embodiment are the same as those of the above-mentioned first embodiment. In the following explanation, the same steps as those of the first embodiment will be omitted and only steps that are different from those of the first embodiment will be described.

At step S71, current detection signals Is (Main) and Is (Sub) for the EPS control, which are output currents of the inverter circuit 12, are read, and at step S72, current detection signals Io (Main) and To (Sub) for detecting overcurrent are read.

Figure 17:
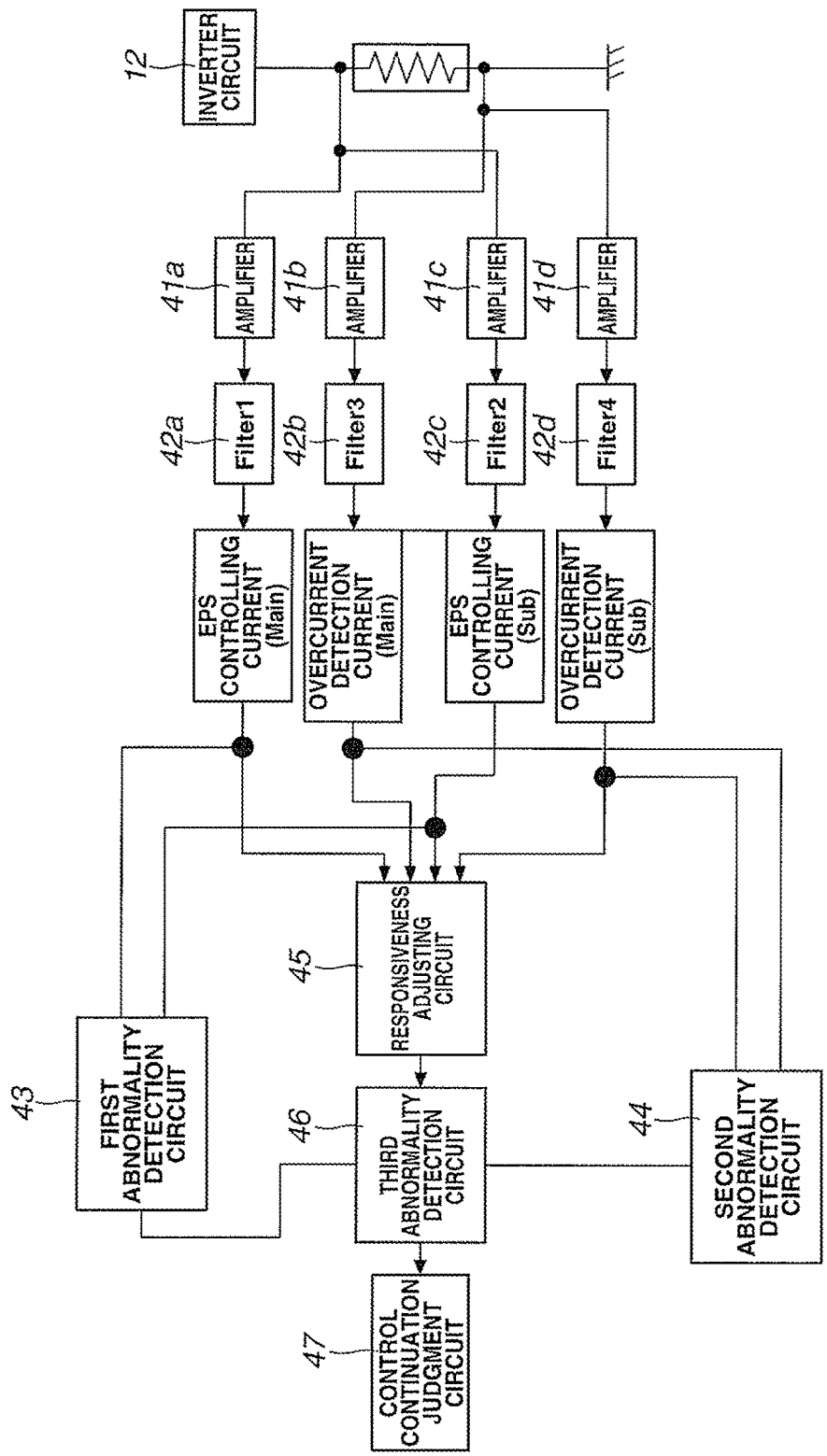
FIG. 17 is a block diagram depicting the abnormal signal detection process employed in the fourth embodiment.

As is seen from FIG. 17, the current detection signals Is (Main) and Is (Sub) for controlling the EPS are signals that are provided by treating values, which are detected by a current sensor 11a, with amplifiers 41a and 41c and first and second filter circuits 42a and 42c. The first and second filter circuits 42a and 42c have substantially the same responsiveness and output the signals to the ECU 4 after effecting a band limitation to the signals or removing specified frequency components of the signals.

As is seen from FIG. 17, the current detection signals Io (Main) and Io (Sub) for detecting overcurrent are signals that are provided by treating values, which are detected by the current sensor 11a, with amplifiers 41b and 41d and third and fourth filter circuits 42b and 42d. The third and fourth filter circuits 42b and 42d have a different responsiveness from the first and second filter circuits 42a and 42c, and output signals to the ECU 4 after effecting a band limitation to the signals or removing specified frequency components of the signals.

Then, at step S73, by a first abnormality detection circuit 43, the current detection signals Is (Main) and Is (Sub) for the EPS control are compared with each other to judge whether or not the deviation therebetween is equal to or greater than an abnormality detection threshold value. Furthermore, in a second abnormality detection circuit 44, the current detection signals Io (Main) and To (Sub) for detecting overcurrent are compared with each other to judge whether or not the deviation therebetween is equal to or greater than an abnormality detection threshold value.

In the fourth embodiment, for detecting abnormality of the current detection signals Is (Main) and Is (Sub) used for controlling the EPS and the current detection signals Io (Main) and Io (Sub) used for detecting the overcurrent, a responsiveness adjusting circuit 45 is employed to adjust the responsiveness for aiming uniformity of them. Usually, the first and second filter circuits 42a and 42c used for treating the current detection signals Is (Main) and Is (Sub) for the EPS control have a higher responsiveness and a higher cutoff frequency. Thus, by filtering further the current detection signals Is (Main) and Is (Sub) for the EPS control, uniformity of the responsiveness is easily achieved.

If desired, both the current detection signals Is (Main) and Is (Sub) for the EPS control and the current detection signals Io (Main) and Io (Sub) for detecting the overcurrent may be adjusted in responsiveness for aiming the uniformity of the responsiveness. By adjusting the responsiveness of both the current detection signals, it is possible to reduce a span of adjusting range of each signal.

Then, at step S74, by a third abnormality detection circuit 46, the current detection signals Is (Main) and Is (Sub) for the EPS control and the current detection signals Io (Main) and Io (Sub) for detecting overcurrent are compared to judge that a value or close value that is possessed by the largest number of the signals is a normal value, and judge that values other than the normal value are abnormal values.

If, at step S4, it is judged that an abnormality detection counter has reached to an abnormality detection threshold value, the operation flow goes to step S75 to carry out judgement as to whether the abnormal signal is one or not and judgment of abnormality of the signal is finished or not. If YES, the operation flow goes to step S13, and If NO, the operation flow goes to step S21. Subsequent processes are the same as those of the above-mentioned first embodiment.

As is described hereinabove, in the fourth embodiment, substantially the same effects as those of the first embodiment are obtained.

Furthermore, an abnormality detection accuracy of the current sensor 11a and that of the filter circuits 42a to 42d that filter the detection signals issued from the current sensor 11a can be increased.

Fifth Embodiment

In the fifth embodiment, the threshold value of the abnormality detection counter, which determines an abnormality in the abnormality determination circuit of the first embodiment, is varied in accordance with a deviation between the steering torque detection signals Tt (Main) and Tt (Sub).

In the following, a power steering device of the fifth embodiment will be described with reference to a flowchart of FIG. 18 and a time chart of FIG. 19.

Figure 18:
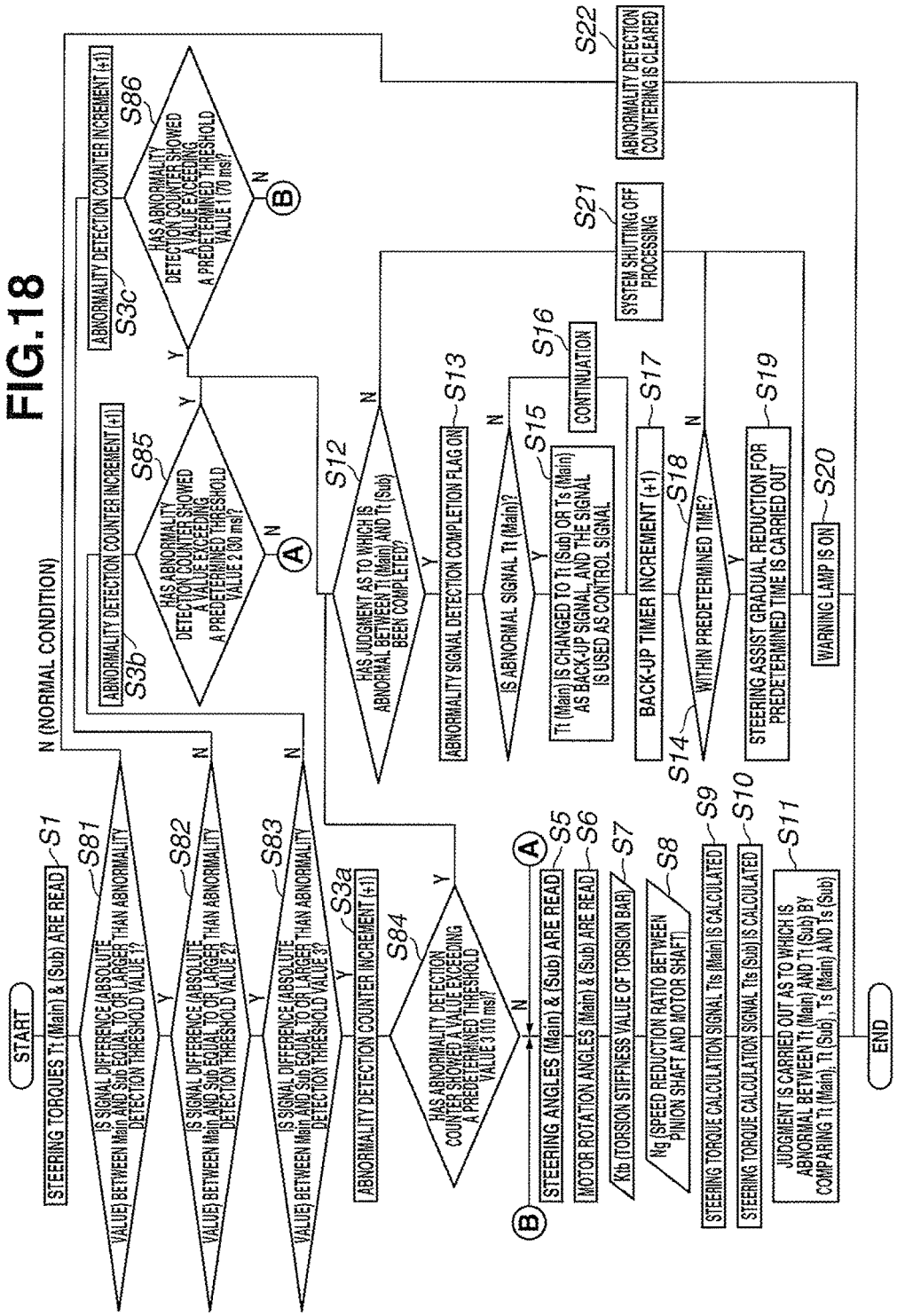
FIG. 18 is a flowchart depicting an abnormal signal detection process employed in a fifth embodiment.
Figure 19:
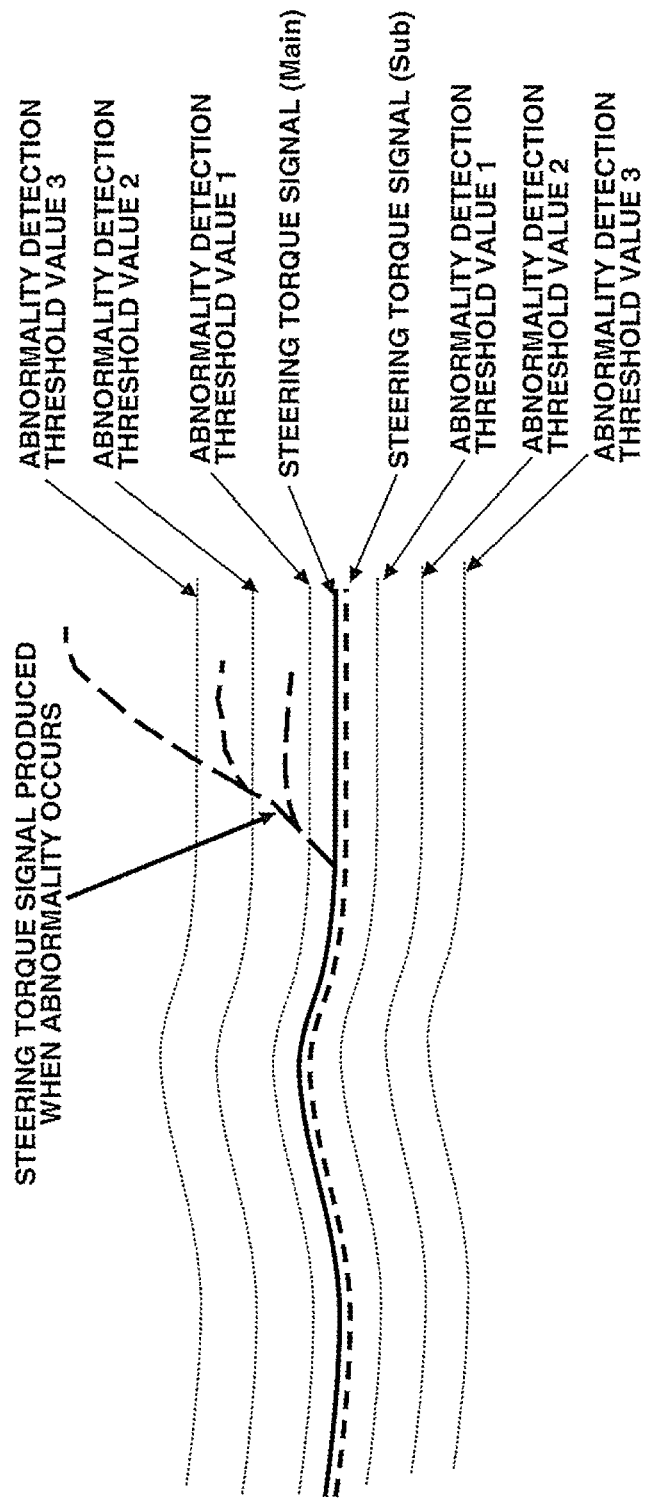
FIG. 19 is a time chart depicting the abnormal signal detection process employed in the fifth embodiment.

As will be understood from FIG. 18, in this fifth embodiment, steps S1, and S5 to S22 are the same as those of the above-mentioned first embodiment. In the following, the same processes as those of the first embodiment will be omitted and only processes that are different from those of the first embodiment will be described.

In the fifth embodiment, an abnormality detection threshold value and an abnormality determination time are set in the following manner (see FIG. 19).

Abnormality Detection Threshold Value 1<Deviation Amount≤Abnormality Detection Threshold Value 2 . . . Abnormality Determination Time A (ms) Abnormality Detection Threshold Value 2<Deviation Amount≤Abnormality Detection Threshold Value 3 . . . Abnormality Determination Time B (ms) Abnormality Detection Threshold Value 1<Deviation Amount . . . Abnormality Determination Time C (ms)

First, at step S81, judgment is carried out as to whether or not the deviation amount is equal to or greater than the abnormality detection threshold value 1. If the deviation amount is equal to or greater than the abnormality detection threshold value 1, the operation flow goes to step S82, and if the deviation amount is smaller than the abnormality detection threshold value 1, the operation flow goes to step S22 to clear the abnormality detection counter to 0 (zero).

At step S82, judgment is carried out as to whether or not the deviation amount is equal to or greater than the abnormality detection threshold value 2. If the deviation amount if equal to or greater than the abnormality detection threshold value 2, the operation flow goes to step S83, and if the deviation amount is smaller than the abnormality detection threshold value 2, the operation flow goes to step S3c.

At step S83, judgment is carried out as to whether or not the deviation amount is equal to or greater than the abnormality detection threshold value 3. If the deviation amount is equal to or greater than the abnormality detection threshold value, the operation flow goes to step S3a, and if the deviation amount is smaller than the abnormality detection threshold value 3, the operation flow goes to step S3b.

At steps S3a, S3b and S3c, the abnormality detection threshold values are subjected to increment, and these incremented threshold values are then subjected to judgment at steps S84, S85 and S86 as to whether the abnormality determination time A (for example, 70 ms), the abnormality determination time B (for example, 30 ms) and the abnormality determination time C (for example, 10 ms) have passed or not, for judging whether the abnormality detection counter has reached the threshold value or not. If the counter has reached the threshold value, the operation flow goes to step S12 judging that the abnormality is determined, and if the counter has not reached the threshold value, the operation flow goes to step S5.

As is seen from the fifth embodiment, by shortening the abnormality determining time by reducing the threshold value of the abnormality detection counter with increase of the difference between abnormality showing signals, safety is enhanced.

In the above, only examples that embody the present invention are described in detail. However, to those skilled in the art, various variations and changes are available within a technical concept defined by the present invention, and thus it is apparent that such variations and changes belong to the scope of protection of Claims.

For example, although in the first to fifth embodiments, the steering assist control is stopped at step S21, a process for limiting the steering assist control may be employed.

In the above-mentioned embodiments, the steering torque detection signals Tt (Main) and Tt (Sub), the steering angle detection signals θ s (Main) and θ s (Sub), the motor rotation angle detection signals θ m (Main) and θ m (Sub), the current detection signals Is (Main) and Is (Sub) for controlling the EPS and the current detection signals Io (Main) and To (Sub) for detecting overcurrent are those that are issued from mutually independent detecting elements. However, if desired, the signals may be those that are issued from a same detection element and treated by different electronic circuits.

In the second embodiment, when, after an abnormality is determined by the first abnormality detection circuit, the vehicle shows its speed lower than a predetermined speed, the steering assist control is gradually reduced and finally stopped. However, if desired, when the vehicle speed is lower than the predetermined speed, the drive control for the electric motor M by the motor control circuit may be continued. When the vehicle speed is lower than the predetermined level, safety of the vehicle is relatively high and the steering load is high, and thus continuation of the steering assist can reduce the steering load of the driver while determining the safety.

In addition to the comparison carried out in the first abnormality determination circuit between the detection signals issued from the sensors of the same type, the steering torque detection signals Tt (Main) and Tt (Sub), the steering angle detection signals θ s (Main) and θ s (Sub) and the motor rotation angle detection signals θ m (Main) and θ m (Sub) may be subjected to a comparison between the signals that have the same unit of measure, for detecting an abnormality of the steering torque sensor TS, the steering angle sensor AS or the motor rotation angle sensor 6. By comparing the signals that have the same unit of measure, calculation and estimation of the signals become easy, and thus, the abnormality detection accuracy is increased and the early abnormality detection becomes possible.

Furthermore, if desired, the first abnormality detection circuit may compare the steering torque detection signal Tt (Sub) issued from the steering torque sensor TS2 placed at the output shaft side of the torsion bar with the motor rotation angle detection signals θ m (Main) and θ m (Sub), for detecting abnormality of the steering torque sensor TS2, the motor rotation angle sensor 61 or the motor rotation angle sensor 62. In this case, between the steering torque detection signal Tt (Sub) and each of the motor rotation angle detection signals θ m (Main) and θ m (Sub), there is no presence of difference caused by the torsion of the torsion bar, and thus, a high accurate comparison is achieved.

Furthermore, if desired, the second abnormality detection circuit may compare the steering angle detection signal θ s (Main) or the steering angle detection signal θ s (Sub) with the steering torque detection signal Tt (Sub) or the motor rotation angle detection signals θ m (Main) and θ m (Sub), for calculating a normal value. In this case, since the steering angle detection signals are of the same angular signals, a high accurate comparison is achieved.

Although, in the fourth embodiment, the current detection sensor is explained or used as a detection element for the vehicle-mounted instrument, the detection element may be a sensor other than the current sensor.

Now, examples other than claimed ones that are defined in the scope of Claims and have a technical concept possessed by the above-mentioned embodiments and effects of the examples will be described in the following.

(a) A power steering device is a device as defined in claim 5, in which the steering mechanism includes a steering shaft connected to the steering wheel and a rotation bar that is connected to a middle portion of the steering shaft in a manner to rotatably connect a steering wheel side of the steering shaft and a steered road wheel side of the steering shaft;

the steering angle sensor detects a rotation angle of a steering wheel side of the steering shaft relative to the torsion bar;

the electric motor is connected to a steered wheel side of the steering mechanism relative to the torsion bar; and the comparison signal production circuit calculates the first steering angle calculation signal based on the first motor rotation angle detection signal and a torsional amount of the torsion bar, and calculates the second steering angle calculation signal based on the second motor rotation angle detection signal and the torsional amount of the torsion bar.

According to the technical concept of (a), when a torsion appears in the torsion bar, there is produced, between the steering angle and the motor rotation angle, a difference that corresponds to a torsional amount produced by the torsion bar. Thus, by correcting the difference, a comparison with much higher accuracy can be carried out.

(b) A power steering device is a device as defined in claim 1, in which the signals used for the comparison in the first abnormality detection circuit are detection signals detected by different detection elements.

According to the technical concept of (b), by comparing the output signals from different detection elements, more preferably output signals from sensors that are different in a detection way. In this case, at the time when an abnormality of the detection signal appears due to an environmental change or the like, the possibility in which the detection signals show the same tendency is low, and thus, the detection accuracy for the abnormality can be increased.

(c) A power steering device is a device as defined in claim 1, in which the abnormality determination circuit is constructed to reduce the predetermined time as a difference between the paired signals used for the comparison in the first abnormality detection circuit increases.

According to the technical concept of (c), the abnormality determination time is shortened as the difference between the signals that show the abnormality is increased, and thus, safety is much increased.

(d) A power steering device is a device as defined in claim 1, in which the control continuation judgment circuit continues the driving and controlling of the electric motor by the motor control circuit until an ignition switch is turned OFF when the normal value is calculated in the second abnormality detection circuit before the abnormality is determined by the abnormality determination circuit, and stops the driving and controlling of the electric motor by the motor control circuit when the ignition switch is turned ON after the ignition switch is turned OFF.

According to the technical concept of (d), when the ignition switch is turned ON after the ignition switch is turned OFF, the safety of the vehicle is kept. By suppressing the steering assist under such condition, restarting of vehicle running, which may include abnormality of the vehicle, can be suppressed.

A power steering device is a device as defined in claim 1, in which the control continuation judgment circuit gradually reduces, with passage of time, the energization quantity to the electric motor for the driving and control of the electric motor by the motor control circuit when the normal value is calculated in the second abnormality detection circuit before the abnormality is determined in the abnormality determination circuit.

According to the technical concept of (e), the assist amount is gradually recued with passage of time, and thus, continuous driving by the driver is suppressed and thus safety is increased.

(f) A power steering device is a device as defined in claim 1, in which the control continuation judgment circuit continues the driving and controlling of the electric motor by the motor control circuit until a vehicle speed becomes lower than a predetermined level when the normal value is calculated by the second abnormality detection circuit before the abnormality is determined by the abnormality determination circuit.

According to the technical concept of (f), safety of the vehicle is assured when the vehicle speed is equal to or lower than the predetermined level. By continuing the steering assist until the vehicle is brought into such condition and thereafter stopping the steering assist, restarting of the vehicle, which may include abnormality of the vehicle, can be suppressed.

(g) A power steering device is a device as defined in claim 1, in which the control continuation judgment circuit continues the driving and controlling of the electric motor by the motor control circuit when, with the vehicle speed being lower than the predetermined level, the normal value is calculated by the second abnormality detection circuit before the abnormality is determined by the abnormality determination circuit.

According to the technical concept of (g), safety of the vehicle is relatively high and the steering load is large when the vehicle speed is equal to or lower than the predetermined level. Thus, by continuing the steering assist, the steering load of the driver can be reduced while assuring the safety of the vehicle.

(h) A power steering device is a device as defined in claim 6, in which the steering mechanism includes a steering shaft connected to the steering wheel and a torsion bar that is connected to a middle portion of the steering shaft in a manner to rotatably connect a steering wheel side of the steering shaft and a steered road wheel side of the steering shaft;

the steering torque sensor includes a first angle sensor that detects a rotation angle of the steering wheel side of the steering shaft and a second angle sensor that detects a rotation angle of the steered road wheel side of the steering shaft, the steering torque sensor detecting the steering torque by calculating a torsional amount of the torsion bar based on output signals from the first and second angle sensors;

the first steering torque detection signal is an output signal from the first angle sensor and the second steering torque detection signal is an output signal from the second angle sensor;

the steering angle sensor detects a rotation angle of the steering wheel side of the steering shaft relative to the torsion bar;

the electric motor is connected to the steered road wheel side of the steering mechanism relative to the torsion bar; and the first abnormality detection circuit detects an abnormality of the steering torque sensor or abnormality of the motor rotation angle sensor by comparing the second steering torque detection signal with the first motor rotation angle detection signal or the second motor rotation angle detection signal.

According to the technical concept of (h), the second steering torque detection signal, the first motor rotation angle detection signal and the second motor rotation angle detection signal have no difference caused by the torsion of the torsion bar, and thus, a high accuracy comparison can be carried out.

(i) A power steering device is a device as defined in (h), in which the second abnormality detection circuit calculates the normal value by comparing the first steering angle detection signal or the second steering angle detection signal with the already compared comparison signal.

According to the technical concept of (i), the steering angle detection signal is of a type that represents an angle, and thus, a high accuracy comparison can be carried out.

(j) A power steering device is a device as defined in claim 6, in which the abnormality determination circuit is constructed to reduce the predetermined time as a difference between the paired signals used in the comparison of the first abnormality detection circuit increases.

According to the technical concept of (j), by reducing the abnormality determination time as the difference between the abnormality representing signals increases, the safety is much increased.

(k) A control device for a vehicle-mounted instrument is a device as defined in claim 7, in which the vehicle-mounted instrument includes an electric motor and the control circuit is an electronic circuit that is equipped with an inverter circuit for driving and controlling the electric motor, and in which when a side where an electric power source is placed for supplying the inverter circuit with an electric power is named as an upstream side, the detection element is placed at a downstream side relative to the inverter circuit and acts as a current sensor for detecting a current value at the downstream side of the inverter circuit, and in which the control circuit drives and controls the electric motor based on the current value that is detected at the downstream side of the inverter circuit by the current sensor.

According to the technical concept of (k), the abnormality detection accuracy of the current sensor and that of the filter circuit that filters the detection signal from the current signal can be increased.

(l) A control device for a vehicle-mounted instrument is a device as defined in (k), in which the responsiveness adjusting circuit receives output signals of the third and fourth filter circuits in addition to the output signals of the first and second filter circuits and adjusts the first responsiveness and the second responsiveness in such a manner that the first responsiveness and the second responsiveness approach each other.

According to the technical concept of (l), by adjusting both the first responsiveness and the second responsiveness, adjusting range of each responsiveness can be reduced, and thus, influence on the output signals can be reduced.

(m) A control device for a vehicle-mounted instrument is a device as defined in claim 7, in which the first abnormality determination circuit makes such a correction that the set time is reduced as a difference between paired signals used for the comparison in the first abnormality detection circuit is increased.

According to the technical concept of (m), by reducing the abnormality determination time as the difference between the abnormality representing signals increases, the safety can be much increased.

The invention claimed is:
1. A power steering device comprising:
a steering mechanism that steers steered road wheels in response to a steering operation of a steering wheel;
an electric motor that provides the steering mechanism with a steering force;
an ECU that drives and controls the electric motor;
a motor control circuit that is installed in the ECU and outputs a motor command signal for driving and controlling the electric motor in accordance with an operation condition of a vehicle;
a steering torque sensor that is installed in the steering mechanism and detects a steering torque produced in the steering mechanism;
a steering angle sensor that is installed in the steering mechanism and detects a steering angle that represents a steering angle amount of the steering wheel;
a motor rotation angle sensor that is provided by the electric motor and detects a rotation angle of a rotor of the electric motor;
a torque signal receiving section that is installed in the ECU and receives two steering torque detection signals outputted from the steering torque sensor, the two steering torque detection signals being first and second steering torque detection signals that are issued from different detecting elements or those that are issued from a same detecting element and then treated by different electronic circuits;
a steering angle signal receiving section that is installed in the ECU and receives two steering angle detection signals outputted from the steering angle sensor, the two steering angle detection signals being first and second steering angle detection signals that are issued from different detecting elements or those that are issued from a same detecting element and then treated by different electronic circuits;
a motor rotation angle signal receiving section that is installed in the ECU and receives two motor rotation angle detection signal issued from the motor rotation angle sensor, the two motor rotation angle detection signals being first and second motor rotation angle detection signals that are issued from different detecting elements or those that are issued from a same detecting element and then treated by different electronic circuits;
a first abnormality detection circuit that is installed in the ECU and detects an abnormality of one of the steering torque sensor, the steering angle sensor and the motor rotation angle sensor by carrying out either one of a first comparison between the first steering torque detection signal and the second steering torque detection signal, a second comparison between the first steering angle detection signal and the second steering angle detection signal and a third comparison between the first motor rotation angle detection signal and the second motor rotation angle detection signal;
an abnormality determination circuit that is installed in the first abnormality detection circuit and determines the abnormality of the one of the sensors when the abnormality of the sensor is detected by the first abnormality detection circuit and the abnormal condition of the sensor is continued for a predetermined time;
a comparison signal production circuit that is installed in the ECU and produces or selects a comparison signal by using a signal other than already compared comparison signals that have been subjected to the first, second and third comparisons in the first abnormality detection circuit, the comparison signal having the same unit of measure as the already compared comparison signals;
a second abnormality detection circuit that is installed in the ECU and compares the comparison signal produced or selected by the comparison signal production circuit with the already compared comparison signal such that a value of the signals which are the same or approximate in value to each other and which a largest number of the signals have is determined as a normal value, and another value is determined as an abnormal value; and a control continuation judgment circuit that is installed in the ECU and continues the driving and controlling of the electric motor by the motor control circuit by using the normal value when the normal value is calculated by the second abnormality detection circuit before the abnormality is determined by the abnormality determination circuit, and stops or limits the driving and controlling of the electric motor when the abnormality is determined by the abnormality determination circuit before the normal value is calculated by the second abnormality detection circuit.

2. A power steering device as claimed in claim 1, in which:
the steering mechanism includes a steering shaft connected to the steering wheel and a torsion bar that is connected to a middle portion of the steering shaft in a manner to rotatably connect a steering wheel side of the steering shaft and a steered road wheel side of the steering shaft;
the steering torque sensor includes a first angle sensor that detects a rotation angle of the steering wheel side of the steering shaft and a second angle sensor that detects a rotation angle of the steered road wheel side of the steering shaft, the steering torque sensor detecting the steering torque by calculating a torsional amount of the torsion bar based on output signals from the first and second angle sensors;
the first steering torque detection signal is an output signal from the first angle sensor and the second steering torque detection signal is an output signal from the second angle sensor; and
the first abnormality detection circuit detects an abnormality of the torque sensor by carrying out the first comparison.

3. A power steering device as claimed in claim 2, in which:
the steering angle sensor detects a rotation angle of a steering wheel side of the steering shaft relative to the torsion bar;
the electric motor is connected to a steered wheel side of the steering mechanism relative to the torsion bar;
the comparison signal production circuit calculates a first steering torque calculation signal, which corresponds to the steering torque, based on the first steering angle detection signal and the first motor rotation angle detection signal, and calculates a second steering torque calculation signal, which corresponds to the steering torque, based on the second steering angle detection signal and the second motor rotation angle detection signal; and
the second abnormality detection circuit calculates the normal value by using the first steering torque detection signal, the second steering torque detection signal, the first steering torque calculation signal and the second steering torque calculation signal.

4. A power steering device as claimed in claim 1, in which:
the first abnormality detection circuit detects an abnormality of the steering angle sensor by carrying out the second comparison.

5. A power steering device as claimed in claim 4, in which:
the comparison signal production circuit calculates a first steering angle calculation signal, which corresponds to the steering angle, based on the first motor rotation angle detection signal, and calculates a second steering angle calculation signal, which corresponds to the steering angle, based on the second motor rotation angle detection signal; and
the second abnormality detection circuit calculates the normal value by using the first steering angle detection signal, the second steering angle detection signal, the first steering angle calculation signal and the second steering angle calculation signal.

6. A power steering device as claimed in claim 5, in which:
the steering mechanism includes a steering shaft connected to the steering wheel and a rotation bar that is connected to a middle portion of the steering shaft in a manner to rotatably connect a steering wheel side of the steering shaft and a steered road wheel side of the steering shaft;
the steering angle sensor detects a rotation angle of a steering wheel side of the steering shaft relative to the torsion bar;
the electric motor is connected to a steered wheel side of the steering mechanism relative to the torsion bar; and
the comparison signal production circuit calculates the first steering angle calculation signal based on the first motor rotation angle detection signal and a torsional amount of the torsion bar, and calculates the second steering angle calculation signal based on the second motor rotation angle detection signal and the torsional amount of the torsion bar.

7. A power steering device as claimed in claim 1, in which:
the signals used for the comparison in the first abnormality detection circuit are detection signals detected by different detection elements.

8. A power steering device as claimed in claim 1, in which:
the abnormality determination circuit is constructed to reduce the predetermined time as a difference between the paired signals used for the comparison in the first abnormality detection circuit increases.

9. A power steering device as claimed in claim 1, in which:
the control continuation judgment circuit continues the driving and controlling of the electric motor by the motor control circuit until an ignition switch is turned OFF when the normal value is calculated in the second abnormality detection circuit before the abnormality is determined by the abnormality determination circuit, and stops the driving and controlling of the electric motor by the motor control circuit when the ignition switch is turned ON after the ignition switch is turned OFF.

10. A power steering device as claimed in claim 1, in which:
the control continuation judgment circuit gradually reduces, with passage of time, the energization quantity to the electric motor for the driving and control of the electric motor by the motor control circuit when the normal value is calculated in the second abnormality detection circuit before the abnormality is determined in the abnormality determination circuit.

11. A power steering device as claimed in claim 1, in which:
the control continuation judgment circuit continues the driving and controlling of the electric motor by the motor control circuit until a vehicle speed becomes lower than a predetermined level when the normal value is calculated by the second abnormality detection circuit before the abnormality is determined by the abnormality determination circuit.

12. A power steering device as claimed in claim 1, in which:
the control continuation judgment circuit continues the driving and controlling of the electric motor by the motor control circuit when, with the vehicle speed being lower than the predetermined level, the normal value is calculated by the second abnormality detection circuit before the abnormality is determined by the abnormality determination circuit.

13. A power steering device comprising:
a steering mechanism that steers steered road wheels in response to a steering operation of a steering wheel;
an electric motor that provides the steering mechanism with a steering force;
an ECU that drives and controls the electric motor;
a motor control circuit that is installed in the ECU and outputs a motor command signal for driving and controlling the electric motor in accordance with an operation condition of a vehicle;
a steering torque sensor that is installed in the steering mechanism and detects a steering torque produced in the steering mechanism;
a steering angle sensor that is installed in the steering mechanism and detects a steering angle that represents a steering angle amount of the steering wheel;
a motor rotation angle sensor that is provided by the electric motor and detects a rotation angle of a rotor of the electric motor;
a torque signal receiving section that is installed in the ECU and receives two steering torque detection signals outputted from the steering torque sensor, the two steering torque detection signals being first and second steering torque detection signals that are issued from different detecting elements or those that are issued from a same detecting element and then treated by different electronic circuits;
a steering angle signal receiving section that is installed in the ECU and receives two steering angle detection signals outputted from the steering angle sensor, the two steering angle detection signals being first and second steering angle detection signals that are issued from different detecting elements or those that are issued from a same detecting element and then treated by different electronic circuits;
a motor rotation angle signal receiving section that is installed in the ECU and receives two motor rotation angle detection signal issued from the motor rotation angle sensor, the two motor rotation angle detection signals being first and second motor rotation angle detection signals that are issued from different detecting elements or those that are issued from a same detecting element and then treated by different electronic circuits;
a first abnormality detection circuit that is installed in the ECU and detects an abnormality of the steering torque sensor, the steering angle sensor or the motor rotation angle sensor by comparing signals of the same unit of measure among the first steering torque detection signal, the second steering torque detection signal, the first steering angle detection signal, the second steering angle detection signal, the first motor rotation angle detection signal and the second motor rotation angle detection signal;

an abnormality determination circuit that is installed in the first abnormality detection circuit and determines an abnormality when the abnormality is detected by the comparison carried out in the first abnormality detection circuit and the abnormal condition is continued for a predetermined time;
a comparison signal production circuit that is installed in the ECU and produces or selects a comparison signal by using a signal other than already compared comparison signals that have been subjected to the comparison in the first abnormality detection circuit, the comparison signal having the same unit of measure as the already compared comparison signals;
a second abnormality detection circuit that is installed in the ECU and compares the comparison signal produced or selected by the comparison signal production circuit with the already compared comparison signal such that a value of the signals which are the same or approximate in value to each other and which a largest number of the signals have is determined as a normal value, and another value is determined as an abnormal value; and
a control continuation judgment circuit that is installed in the ECU and continues the driving and controlling of the electric motor by the motor control circuit by using the normal value when the normal value is calculated by the second abnormality detection circuit before the abnormality is determined by the abnormality determination circuit, and stops or limits the driving and controlling of the electric motor when the abnormality is determined by the abnormality determination circuit before the normal value is calculated by the second abnormality detection circuit.

14. A power steering device as claimed in claim 13, in which:
the steering mechanism includes a steering shaft connected to the steering wheel and a torsion bar that is connected to a middle portion of the steering shaft in a manner to rotatably connect a steering wheel side of the steering shaft and a steered road wheel side of the steering shaft;
the steering torque sensor includes a first angle sensor that detects a rotation angle of the steering wheel side of the steering shaft and a second angle sensor that detects a rotation angle of the steered road wheel side of the steering shaft, the steering torque sensor detecting the steering torque by calculating a torsional amount of the torsion bar based on output signals from the first and second angle sensors;
the first steering torque detection signal is an output signal from the first angle sensor and the second steering torque detection signal is an output signal from the second angle sensor;
the steering angle sensor detects a rotation angle of the steering wheel side of the steering shaft relative to the torsion bar;
the electric motor is connected to the steered road wheel side of the steering mechanism relative to the torsion bar; and
the first abnormality detection circuit detects an abnormality of the steering torque sensor or an abnormality of the motor rotation angle sensor by comparing the second steering torque detection signal with the first motor rotation angle detection signal or the second motor rotation angle detection signal.

15. A power steering device as claimed in claim 14, in which:

the second abnormality detection circuit calculates the normal value by comparing the first steering angle detection signal or the second steering angle detection signal with the already compared comparison signal.

16. A power steering device as claimed in claim 13, in which:
the abnormality determination circuit is constructed to reduce the predetermined time as a difference between the paired signals used in the comparison of the first abnormality detection circuit increases.

* * * * *